United States Patent
Pratte et al.

(10) Patent No.: US 8,510,814 B2
(45) Date of Patent: Aug. 13, 2013

(54) METHOD AND APPARATUS FOR NETWORK AUTHENTICATION OF HUMAN INTERACTION AND USER IDENTITY

(75) Inventors: Warren Pratte, Ottawa (CA); David Stephenson, Ottawa (CA)

(73) Assignee: Binary Monkeys, Inc., Ottawa, Ontario (CA)

( * ) Notice: Subject to any disclaimer, the term of this patent is extended or adjusted under 35 U.S.C. 154(b) by 1205 days.

(21) Appl. No.: 12/023,328

(22) Filed: Jan. 31, 2008

(65) Prior Publication Data

US 2008/0216163 A1    Sep. 4, 2008

Related U.S. Application Data

(60) Provisional application No. 60/887,458, filed on Jan. 31, 2007.

(51) Int. Cl.
| | |
|---|---|
| G06F 7/04 | (2006.01) |
| G06F 15/16 | (2006.01) |
| G06F 17/30 | (2006.01) |
| G06F 12/00 | (2006.01) |
| G06F 12/14 | (2006.01) |
| G06F 13/00 | (2006.01) |
| H04L 29/06 | (2006.01) |
| G11C 7/00 | (2006.01) |

(52) U.S. Cl.
USPC .............................................. 726/7; 726/20

(58) Field of Classification Search
USPC ....................................................... 726/7, 20
See application file for complete search history.

(56) References Cited

U.S. PATENT DOCUMENTS

| | | | |
|---|---|---|---|
| 5,559,961 A | | 9/1996 | Blonder |
| 2004/0010721 A1 | | 1/2004 | Kirovski |
| 2004/0219902 A1 | | 11/2004 | Lee et al. |
| 2005/0010785 A1 | | 1/2005 | Abe et al. |
| 2005/0065802 A1 | * | 3/2005 | Rui et al. ........................ 705/1 |
| 2005/0066201 A1 | | 3/2005 | Goodman et al. |
| 2005/0268100 A1 | * | 12/2005 | Gasparini et al. ............ 713/170 |

(Continued)

OTHER PUBLICATIONS http://www.captcha.net.

(Continued)

*Primary Examiner* — Ashok Patel
*Assistant Examiner* — Lawrence Cosby
(74) *Attorney, Agent, or Firm* — McDonnell Boehnen Hulbert & Berghoff LLP

(57) ABSTRACT

A method and apparatus are provided to enable a server to determine if a client connecting to the server is doing so by means of human user interaction, as opposed to an automated process. In order to authorize access to services, the option of determining user identity, such as by means of a graphical shared secret, is also provided. Three aspects are described: (i) image formation from an object model; (ii) presentation of image choices to a user, and (iii) user action. Image formation includes the creation of one or more categorized 2-dimensional images with object regions for each image automatically qualified. These one or more categorized images can be created by means of a Randomizable Image Generation Object for Human Recognition, comprised of (i) a 3-dimensional object model, (ii) a plurality of rendering threshold and constraint parameters, and (iii) categorization and qualitative metadata. The one or more 2-dimensional images are preferably transmitted to the user for authentication without the image metadata, which may be retained on the server. Related inquiry text can be sent when human user interaction is being determined and not user identity authentication.

22 Claims, 15 Drawing Sheets

(56) References Cited

U.S. PATENT DOCUMENTS

2005/0278253 A1   12/2005   Meek et al.
2007/0026372 A1   2/2007    Huelsbergen
2007/0043681 A1   2/2007    Morgan et al.
2008/0050018 A1*  2/2008    Koziol .......................... 382/187

OTHER PUBLICATIONS http://www.cs.sfu.ca/~mori/research/gimpy.
http://www.thepcspy.com/kittenauth.
http://research.microsoft.com/asirra.

* cited by examiner

METHOD AND APPARATUS FOR NETWORK AUTHENTICATION OF HUMAN INTERACTION AND USER IDENTITY

CROSS-REFERENCE TO RELATED APPLICATION

This application claims the benefit of U.S. provisional patent application Ser. No. 60/887,458, filed on Jan. 31, 2007, the entire contents of which are hereby incorporated herein by reference.

FIELD OF THE INVENTION

The present invention relates generally to network authentication. More particularly, the present invention relates to a method and apparatus for distinguishing between a human user and an automated process, and optionally for authenticating user identity.

BACKGROUND OF THE INVENTION

In networked environments, such as the internet, authentication is a critical component in preventing abuse and unauthorized access to services.

One aspect of authentication involves distinguishing a human from an attacking automated process (i.e. a software robot). A variety of undesirable behaviors can be propagated by such software robots including: controlling compromised client computers ("botnets"), sending SPAM messages, inflating per click advertising selections on websites, posting unwanted messages to message boards, and creating masses of free email or web page accounts in order to provide easily discarded and anonymous platforms for illicit activities (such as "phishing" used for identity theft), and others.

An authentication test for distinguishing a human from an attacking automated process should be one which most humans can solve, easy for server machines administering the test to generate and evaluate, but difficult for a computer running an attacking automated process to solve accurately.

Current methods for distinguishing a human from an attacking automated process include CAPTCHAs (Completely Automated Public Turing Tests to tell Computers and Humans Apart) and HIP (Human Interactive Proof). The most prevalent method involves generating an image with alphanumeric text that is obscured or distorted such that it is difficult for an attacking automated process to decipher but still legible to humans. This method has proved susceptible to exploitation, since automated character recognition software has become increasingly sophisticated. The threshold at which the text remains easily legible to humans is being crossed in an effort to defeat automated character recognition software. Part of the problem lies in the fact that the text characters must remain within constrained bounds in order to be legible, and this narrows the problem domain for the character recognition software. Furthermore, alphanumeric CAPTCHA methods suffer from challenges in representing multilingual character sets.

Another form of CAPTCHA use selected images from a large database of manually classified images that a user must identify. A problem with this method is that an attacker need only create a dictionary of known photographs being referenced by the CAPTCHA in order to compare. Comparing the metrics of one image to another (such as by using one or more pattern image signatures) is a well defined domain problem that can be solved by an attacking automated process. As such, the database of images must remain secret, and this significantly limits the practical options for deployment of such systems.

Another problem with this method lies in finding a sufficient number of categorized images to use as a source so as to make a brute force dictionary attack of image comparison more statistically difficult. The most prevalent current practice is to draw upon tagged internet images. However, tagging (i.e. categorizing) of images can be inconsistent resulting in confusing or unsolvable CAPTCHAs (for example, the term "Python" can refer to the programming language Python, a type of bicycle, a snake, a type of car security system, and more).

Such systems are not very resistant to image comparison attacks since they are based on a finite source of images, which may not be categorized or defined with enough certainty to result in a satisfactory authentication test.

A second aspect of authentication involves verifying the identity of a user, thereby allowing a server or other computer to establish permission for providing services. The most common method of this kind of authentication involves the use of a shared secret that the user must enter, and most often consists of alphanumeric text password.

Shared secret passwords are susceptible to several means of exploitation. Computers may be compromised without knowledge of the user by malicious "hackers", usually by means of a tool called a "root kit" or "backdoor". The tool is installed by means of a virus, Trojan horse file, or exploitation of a security flaw in the computer software of the target system. The "hacker" may then use keystroke logging software to record the passwords entered by the user, or use screen capture software to extract passwords from images of login sites. Passwords may also be discovered using automated methods such as brute force attack (trying multiple combinations of letters and numbers until successful) and dictionary attacks (using common combinations of words and phrases).

In current practice the shared secret (i.e. password) authentication is an additional step the user must contend with in addition to solving a CAPTCHA.

SUMMARY OF THE INVENTION

In one embodiment, the present invention provides a system and method for distinguishing between a human user and an automated process. In another embodiment, user identity can also be authenticated.

In one broad aspect, there is provided a computer-implemented method for authenticating a user of a computer comprising: selecting one or more 3-dimensional models, each of the one or more 3-dimensional models containing geometric shape data for a respective object in three spatial dimensions; receiving one or more rendering parameters associated with each respective object; for each respective object, randomly varying the one or more rendering parameters, within predefined thresholds and/or constraints, such that each respective object remains recognizable by a human; generating a 2-dimensional image based on the result of the varying step; generating metadata based on each respective object, and the one or more rendering parameters; communicating the 2-dimensional image for presentation at the computer; receiving user input data concerning the 2-dimensional image; comparing the metadata and the user input data to determine if the user interacting with the computer is a human user; and authenticating or not authenticating based on the result of the comparing step.

In some embodiments, communicating the 2-dimensional image comprises communicating the 2-dimensional image over a computer network to a remote computer. In some embodiments, the computer network is the Internet. In some embodiments, the computer network is an Intranet. In some embodiments, the computer network is a wireless network.

In some embodiments, the method further comprises storing a shared secret; and wherein selecting one or more 3-dimensional models comprises selecting at least one 3-dimensional model based on the shared secret; and wherein comparing the metadata and the user input data comprises determining whether the shared secret and the user input data are identical.

In some embodiments, the method further comprises storing the metadata at a memory located apart from the remote computer.

In some embodiments, there is provided a computer readable medium having computer executable instructions stored thereon for execution by one or more computers, that when executed implement the method set out above.

In another broad aspect, there is provided a system for authenticating a user comprising: a processor for: selecting one or more 3-dimensional models, each of the one or more 3-dimensional models containing geometric shape data for a respective object in three spatial dimensions; receiving one or more rendering parameters associated with each respective object; for each respective object, randomly varying the one or more rendering parameters, within pre-defined thresholds and/or constraints, such that each respective object remains recognizable by a human; generating a 2-dimensional image based on the result of the varying step; generating metadata based on each respective object, and the one or more rendering parameters; communicating the 2-dimensional image for presentation at a computer; receiving user input data concerning the 2-dimensional image; comparing the metadata and the user input data to determine if the user interacting with the computer is a human user; and authenticating or not authenticating based on the result of the comparing step.

BRIEF DESCRIPTION OF THE DRAWINGS

The invention will now be described in greater detail with reference to the accompanying diagrams, in which.

DETAILED DESCRIPTION

Figure 1A:
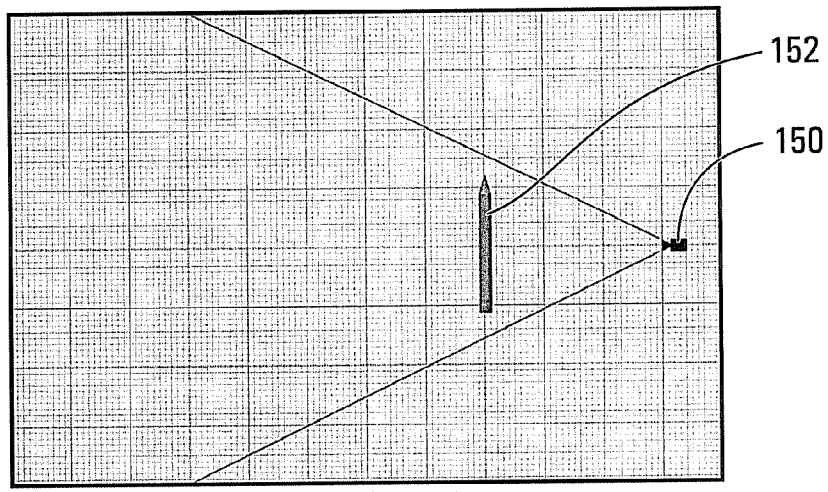
FIG. 1A shows a top-down perspective illustration of a rendering environment with a pencil object at default geometry scale and positioned near a camera.

In one embodiment, the present invention includes three aspects: (i) image formation from object model; (ii) presentation of image choices, and (iii) user action.

Image formation includes the creation of categorized 2-dimensional images with object regions for each image automatically qualified. These categorized images can be created by means of a Randomizable Image Generation Object for Human Recognition (RIGOHR), comprised of (i) a 3-dimensional object model, (ii) a plurality of rendering threshold and constraint parameters, and (iii) categorization and qualitative metadata. The inventors have coined the acronym RIGOHR to describe this technology and for brevity and consistency, the term RIGOHR is used in this application when discussing this technology.

RIGOHR is part of a computer implemented method which automates the generation of images such that any 3-dimensional object may be presented to a user in 2-dimensional form with a high degree of random variation while retaining human recognizeability for the purpose of human user authentication.

A RIGOHR is provided, typically but not necessarily at a server, and can consist of data preferably stored on a machine-readable medium, such as a memory means. The 3-dimensional object model defines objects (as is known in the art) by means of geometry data and may be constructed using a variety of techniques (such as polygonal modeling, NURBS, subdivision surfaces, etc). A plurality of RIGOHRs can be stored as files on the server. The server can comprise one or more networked computer systems. This data may also be organized by means of a database system.

One or more 2-dimensional images generated by embodiments of the invention are transmitted to the user for authentication without the image metadata, which may be retained on a server. In one embodiment, related inquiry text can be sent to a client to assist in the authentication of human user interaction. In other embodiments, pictures of synonymous objects could be sent to the client as prompts for object selection. In other embodiments, voice prompts could be sent to the client. The system ensures there is no interaction by an attacking automated process because it would be difficult for an automated process to identify and/or distinguish between the object(s) prompted for selection.

Accordingly, there is provided a method to determine that a human user (as opposed to an automated process) is initiating authentication.

The authentication architecture can include a server for generating images from a library of known 3-dimensional objects, with associated metadata categorizing these objects and setting variability of rendering parameters. The server can include a database for storing 3-dimensional image data for each object. A software process can reference the metadata to select objects and randomly set rendering parameters within thresholds and options defined, with the result passed to a software or hardware renderer to create 2-dimensional images. The 2-dimensional images can be based on a scene construction comprising at least one 3-dimensional object from the library.

The library of 3-dimensional objects can be generated based on the needs and known uses according to embodiments of the present invention. In this way, the objects can have all of the desired parameters, variability and randomization. In some embodiments, the library would contain 3-dimensional models, each containing geometric shape data for each respective object in three spatial dimensions.

A 2-dimensional image based on one or more objects can be generated, the image being associated with metadata describing the images. The server can pass the 2-dimensional image (but not the image metadata) to a client computer where a user should identify specific objects, sets of objects, and/or aspects of one or more objects in the image. The user selections can be returned to the server and compared against the image metadata to determine if the user has accurately identified the object(s) or aspects of the object(s) required. Successful identification can result in authorization being granted to the user.

Rendering parameter data of a RIGOHR can be represented in threshold or constraint states. Parameters in a threshold state can define a range for permissible randomization of values (for example, the object may be rendered between 20% to 70% transparent). Parameters in a constraint state can define one or more specific options that may be randomly selected (for example, the object may be rendered with a red, purple, or orange surface color only).

For example, if a RIGOHR was to represent a "zebra" it may have a constraint set for the mapping to only select variations of stripes. This is a constraint state, since the stripes are a key recognition factor required to differentiate the object from a horse, donkey, or other equine. However, the zebra may still be recognized as such (due to the shape and stripes) despite color variations. For example, regardless if the stripes are blue and yellow, black and white, or green and pink, a user may still recognize the object as a zebra. In such a case, the coloration of the stripes would therefore be threshold values, defining ranges of possible colors that can be randomly selected.

In one embodiment, rendering parameters can encompass multiple data points and hierarchical values. For example, threshold parameters may represent a multi-dimensional range (e.g. areas of 2D color spectrum). Constraint parameters may employ hierarchical selections to represent multi-valued options (e.g. a collection of material property variances).

Examples of rendering parameters of a RIGOHR can include any one or more of, but are not limited to:

a. limits to position, rotation, and scale in 3-dimensional environment relative to a projection (e.g. a camera);
b. limits to visible area (i.e. the amount of surface area of the object visible within the bounds of the rendered image and not occluded by other objects in the environment);
c. limits to critical visible geometry regions (i.e. identifies regions of geometry of the object that should remain visible within the bounds of the rendered image and not occluded by other objects in the environment);
d. limits to material property variances (shaders, color, texture, reflectivity, specularity, transparency, ambient color, emissivity, refraction index, bump mapping, etc);
e. transformation limits (deformation, skeletal animation, etc);
f. limits to lighting variances (type, intensity, color, position, angle, and number); and/or
g. limits to environmental effects (depth of field, motion blur, lens flares, fogging, shadows, etc);

RIGOHR rendering parameters can be defined in reference to a default environment, providing a baseline state for setting parameter values. The parameters can vary depending on the particular rendering technology applied, with the goal to provide variability and randomization of rendering properties within thresholds or constraints that retain the ability of human viewers to readily identify the objects in the resulting image.

In order to illustrate how human recognition factors can be maintained by threshold and constraint rendering parameters, examples of particular parameters from among those outlined above will now be provided.

Figure 1B:
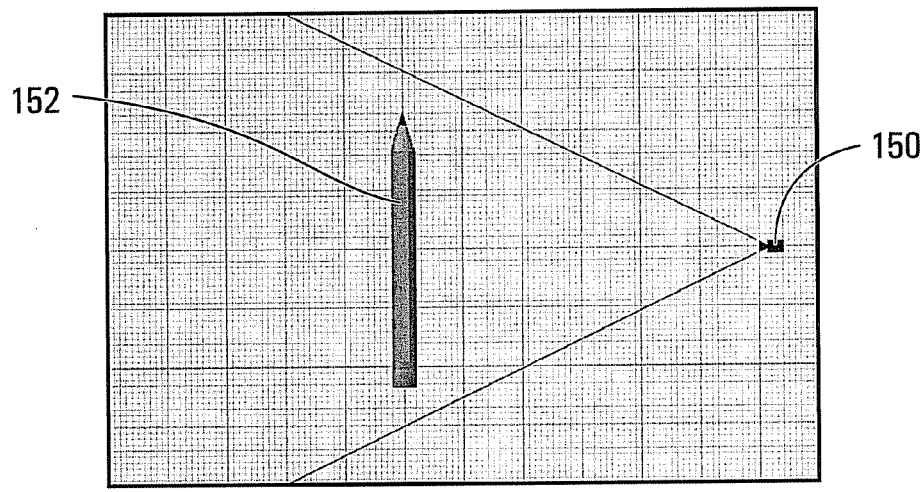
FIG. 1B shows a top-down perspective illustration of a rendering environment with the object geometry scale enlarged and positioned farther from the camera.
Figure 1C:
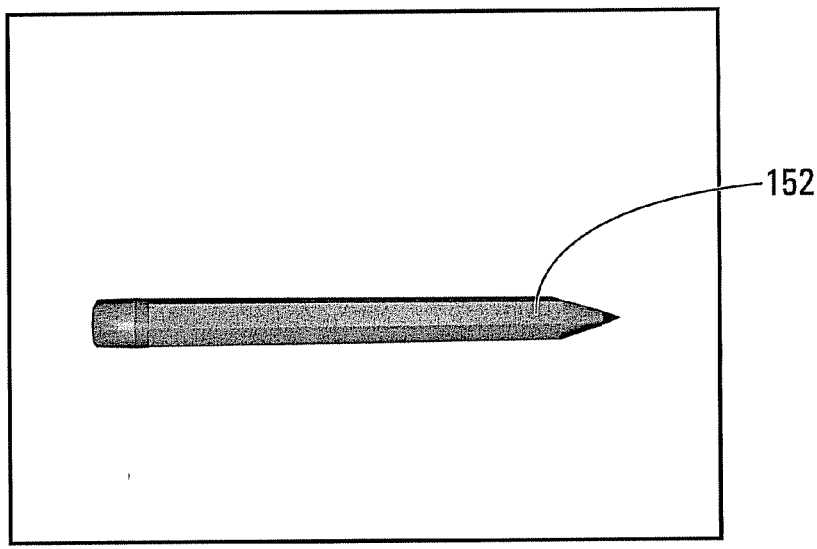
FIG. 1C shows a camera perspective illustration of a resulting rendered 2-dimensional image of both the FIG. 1A and FIG. 1B environments.

As shown in FIGS. 1A, 1B and 1C, position, rotation, and scaling threshold or constraints of a pencil object 152 are maintained relative to a projection (in this case, camera 150). FIG. 1A shows a top-down perspective illustration of a rendering environment with a pencil object 152 at default geometry scale and positioned near camera 150. FIG. 1B shows a top-down perspective illustration of a rendering environment with the object geometry scale enlarged and positioned farther from camera 150. FIG. 1C shows a camera perspective illustration (i.e. from the perspective of camera 150) of a resulting rendered 2-dimensional image of both the FIG. 1A and FIG. 1B environments.

As shown in FIG. 1A, if the projection (i.e. camera 150) is moved closer to "pencil" object 152, its scale in the image increases. As shown in FIG. 1B, this is equivalent to increasing the XYZ geometry scaling of "pencil" object 152. Both examples as shown in FIGS. 1A and 1B result in the same object scale in the resulting image, as shown in FIG. 1C.

The examples in FIGS. 1A, 1B and 1C illustrate how threshold and constraint rendering parameters (in this case scaling) of a RIGOHR are maintained as a relationship between the position of the projection and that of the object geometry in order to facilitate human recognition. So if a scale threshold defined by the RIGOHR for a particular object were set between 50% and 200%, for example, the relative scaling of the object could be any randomized amount between half and double its scale in the resulting 2-dimensional image and human recognizeability would still be maintained.

Figure 2A:
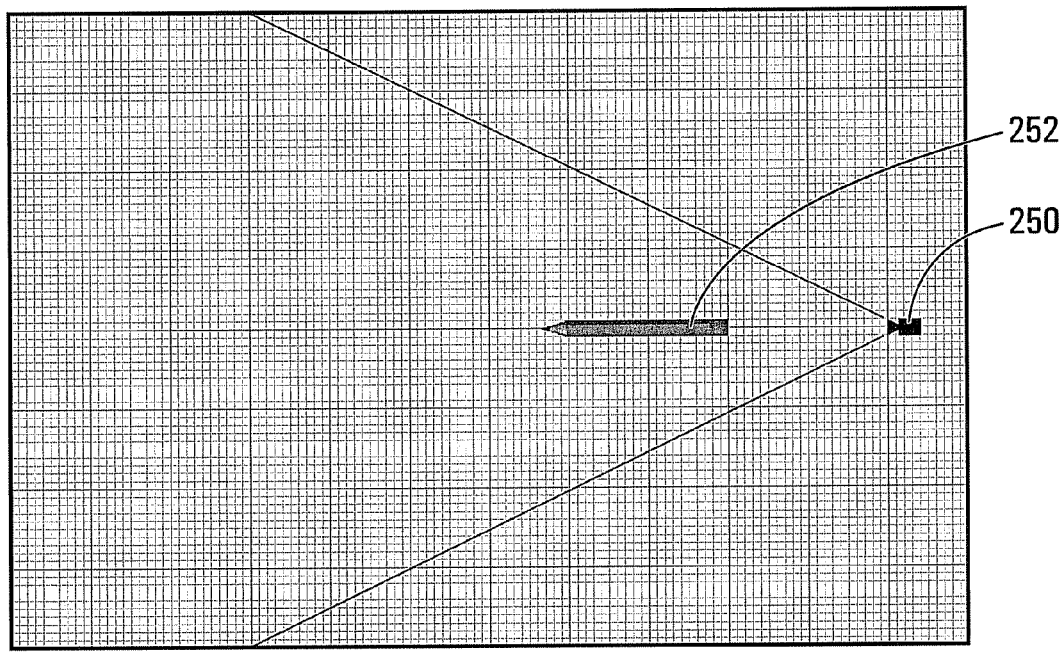
FIG. 2A shows a top-down perspective illustration of a rendering environment with a pencil object rotated beyond defined thresholds end-on to a camera.
Figure 2B:
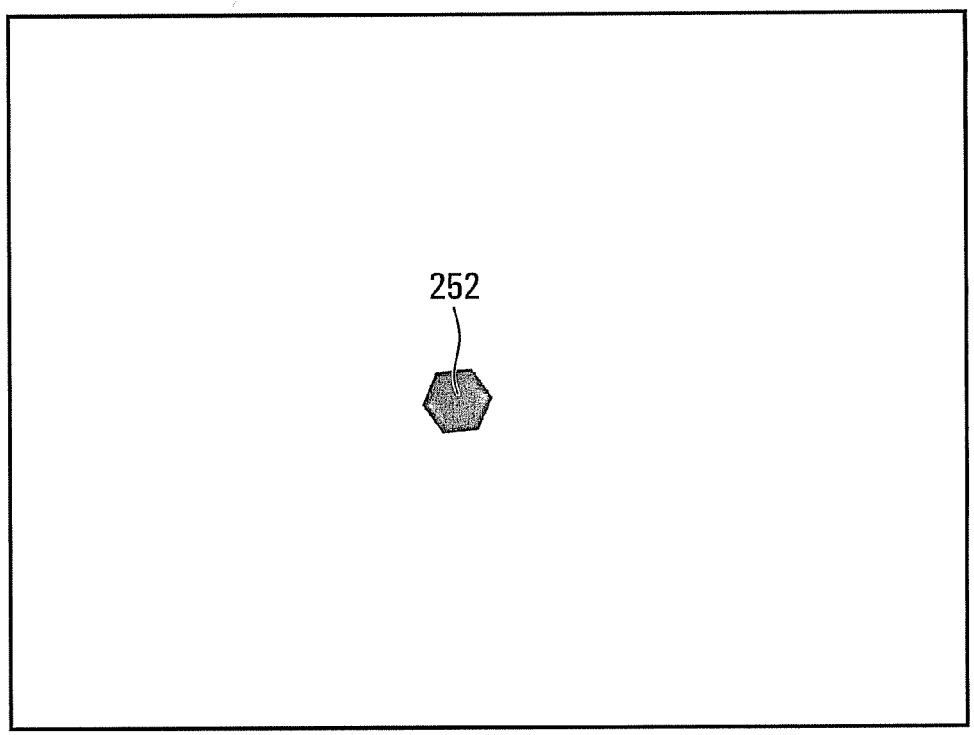
FIG. 2B shows a camera perspective illustration of a resulting rendered 2-dimensional image of the environment shown in FIG. 2A.

In another example, the rotational threshold or constraint parameters of a RIGOHR in relationship to the projection (i.e. the viewing angle) are maintained in order to facilitate human recognition. FIG. 2A shows a top-down perspective illustration of a rendering environment with a pencil object 252 rotated beyond defined thresholds end-on to a camera 250. FIG. 2B shows a camera perspective illustration (i.e. from the perspective of camera 250) of a resulting rendered 2-dimensional image of the environment shown in FIG. 2A.

As shown in FIG. 2A, the viewing angle of pencil object 252 is set beyond limits which should be defined by the RIGOHR rotational thresholds to facilitate human recognition. This results in an "end on" viewing angle, and pencil object 252 therefore appears in the 2-dimensional image of FIG. 2B as a hexagon. As a result, human recognition factors are reduced and pencil object 252 is less likely to be correctly identified by a human user. This example illustrates the importance of threshold and constraint rendering parameters of a RIGOHR in providing randomization of parameter values while maintaining human recognition factors.

Figure 3A:
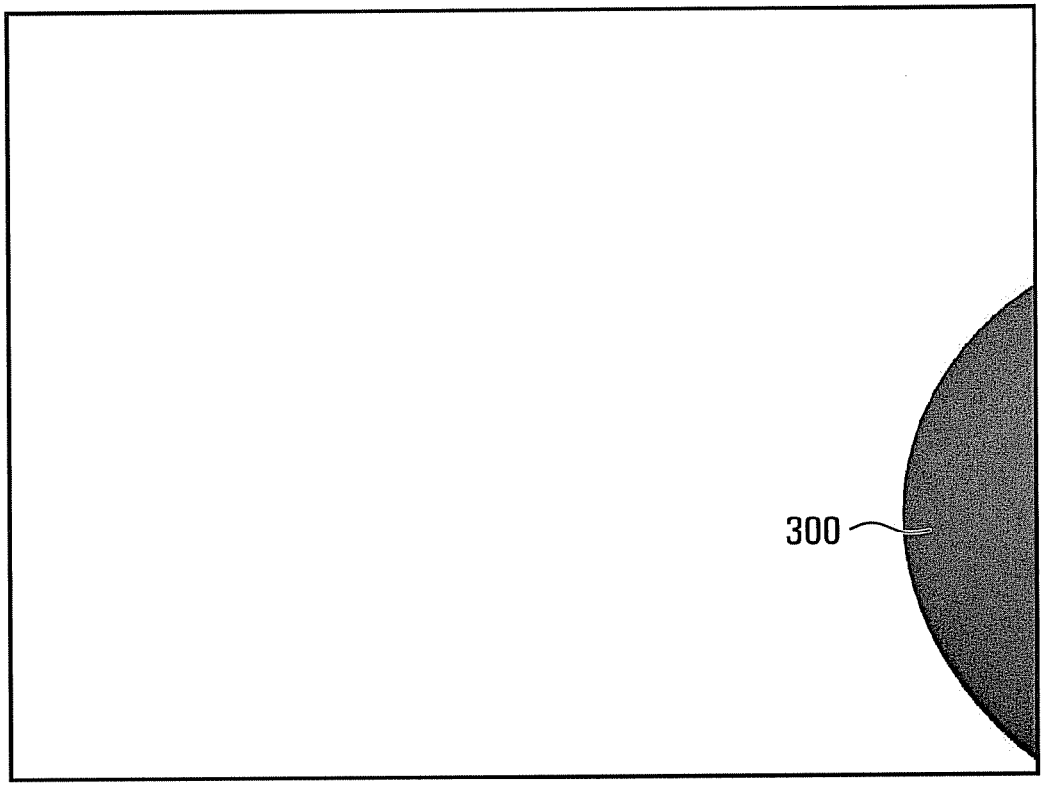
FIG. 3A shows a camera perspective illustration of a rendering of the Earth where less than a minimum threshold of the rendered object area is visible within the image.
Figure 3B:
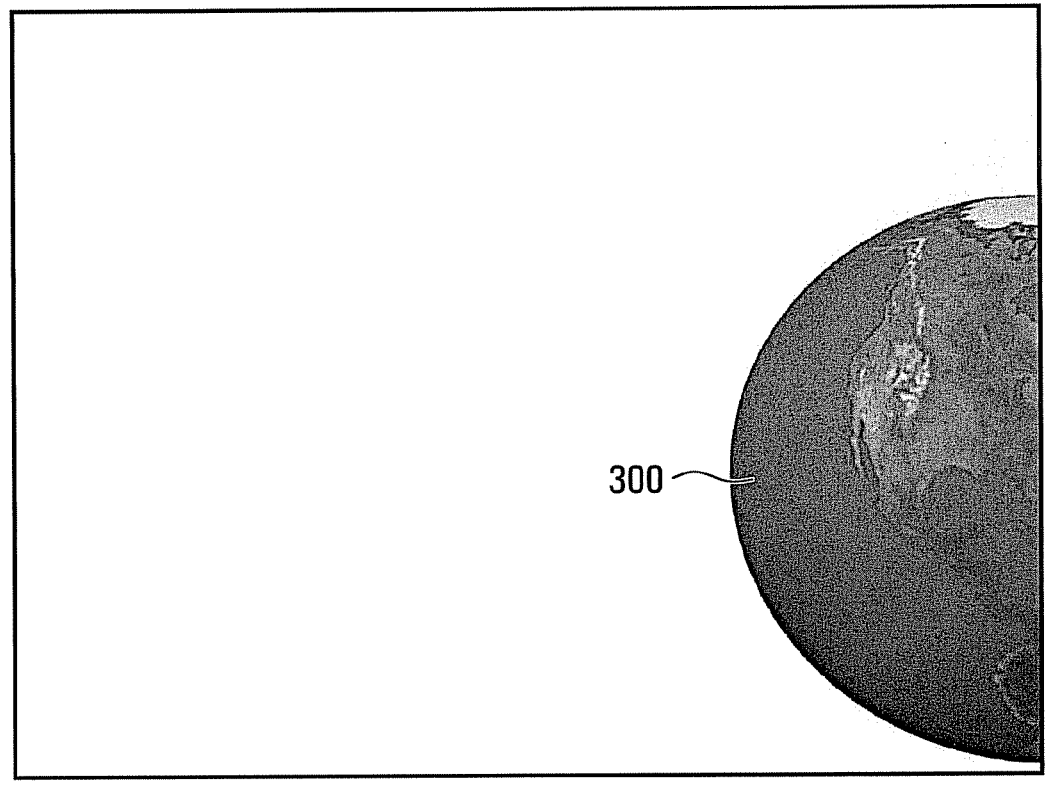
FIG. 3B shows a camera perspective illustration of a rendered 2-dimensional image of the Earth where the minimum threshold is maintained.

In FIGS. 3A and 3B, application of the visible area threshold parameter of a RIGOHR (i.e. the amount of surface area of the object visible within the bounds of the rendered image and not occluded by other objects in the environment) is illustrated. FIG. 3A shows a camera perspective illustration of a rendering of the Earth where less than a minimum threshold of the rendered object area is visible within the image. FIG. 3B shows a camera perspective illustration of a rendered 2-dimensional image of the Earth where the minimum threshold is maintained. In this case, the minimum threshold would be approximately 50%, though 50% is merely an example.

As shown in FIG. 3A, the visible area of the Earth object 300 relative to the projection bounds is less than a minimum threshold defined in the RIGOHR (e.g. 50%). This results in a relatively small area of Earth object 300 being visible within the bounds of the image. As a result, human recognition factors would be reduced. When the minimal visible area as defined by the RIGOHR is maintained, as shown in FIG. 3B, Earth object 300 becomes more readily identifiable to a human user as "planet earth".

Figure 4A:
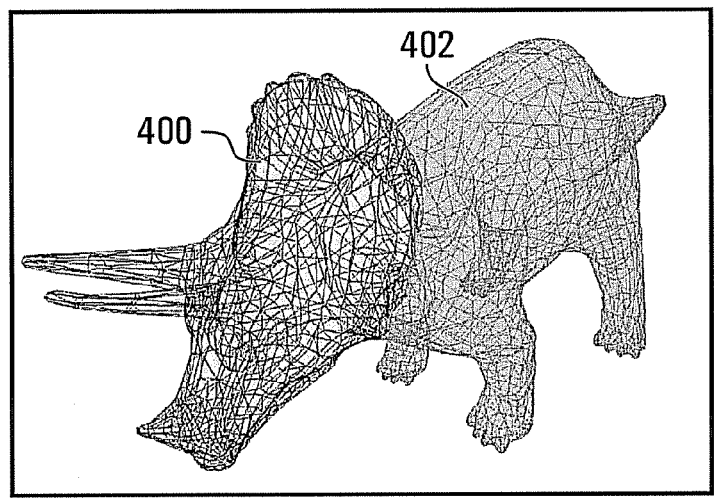
FIG. 4A is a camera perspective illustration of a rendering environment of the head of a dinosaur object identified as critical visible geometry.
Figure 4B:
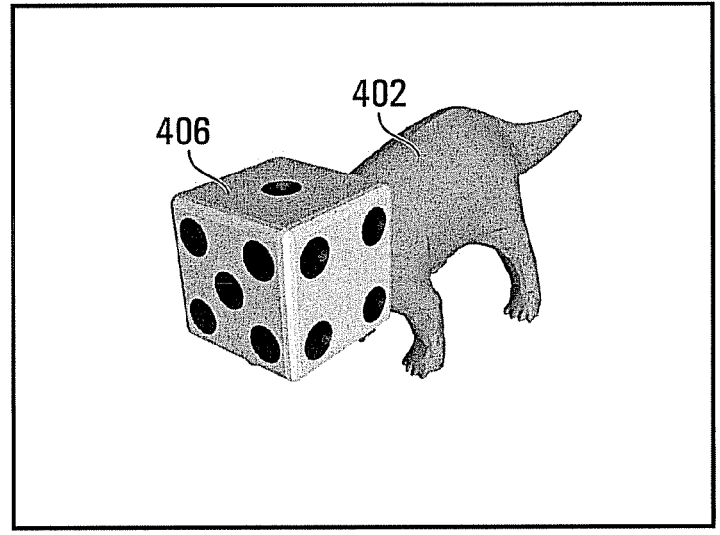
FIG. 4B is a camera perspective illustration of a rendered 2-dimensional image of the critical visible geometry of the dinosaur object being obscured by a dice object.
Figure 4C:
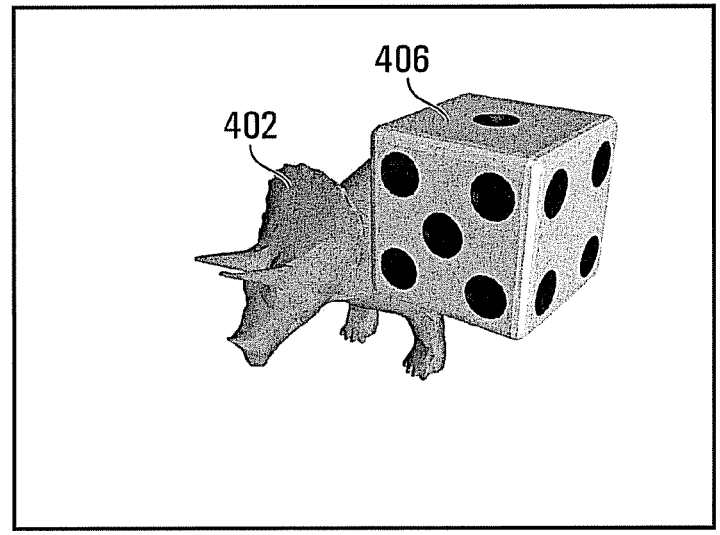
FIG. 4C is a camera perspective illustration of a rendered 2-dimensional image of the dinosaur object and the dice object where critical visible geometry is maintained.

FIGS. 4A, 4B and 4C demonstrate the RIGOHR parameter of critical visible geometry. FIG. 4A is a camera perspective illustration of a rendering environment of the head 400 of a dinosaur object 402, which in this case would be identified as critical visible geometry. FIG. 4B is a camera perspective illustration of a rendered 2-dimensional image of the critical visible geometry of the dinosaur object 402 being obscured by a dice object 406. FIG. 4C is a camera perspective illustration of a rendered 2-dimensional image of dinosaur object 402 and dice object 406 where critical visible geometry is maintained.

The critical visible geometry indicates regions of an object that should remain visible within the bounds of the rendered image and not occluded by other objects in the environment in order to facilitate human recognition. As shown in FIG. 4B, when the critical visible geometry is not maintained (in this case occluded by dice object 406), the human recognition factors are reduced and the object is no longer easily identified. When the critical visible geometry as defined by the RIGOHR is maintained, as shown in FIG. 4C, dinosaur object 402 becomes more easily identifiable by a human user.

Figure 5A:
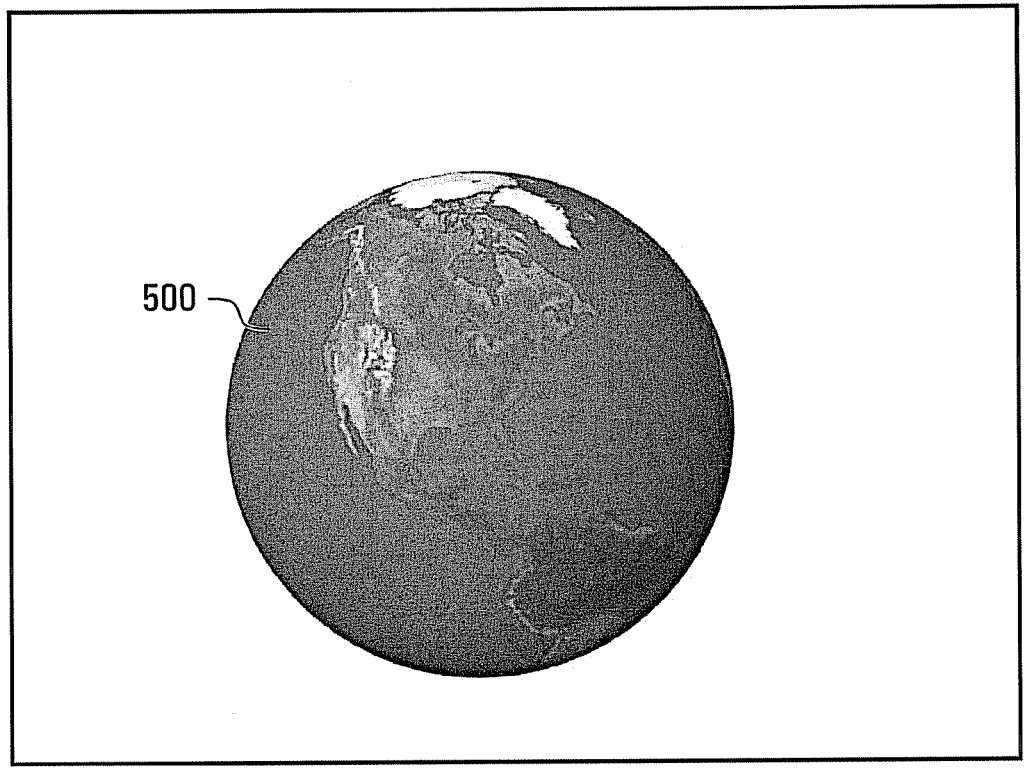
FIG. 5A is a camera perspective illustration of a rendered 2-dimensional image of the Earth where an appropriate texture constraint is applied.
Figure 5B:
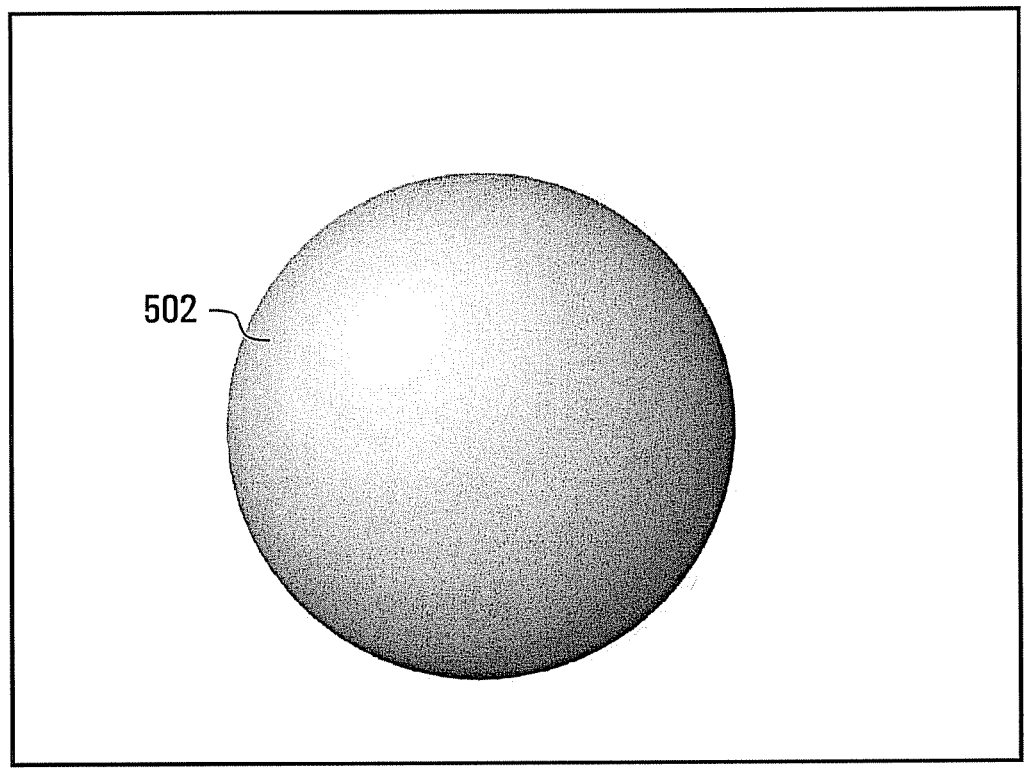
FIG. 5B is a camera perspective illustration of a rendered 2-dimensional image of the Earth where the texture constraint for the Earth object is violated.

FIGS. 5A and 5B illustrate the application of a material property constraint parameter in RIGOHR, in this case the texture map. FIG. 5A is camera perspective illustration of a rendered 2-dimensional image of the Earth where an appropriate texture constraint is applied. FIG. 5B is a camera perspective illustration of a rendered 2-dimensional image of the Earth where the texture constraint for the Earth object is violated.

A RIGOHR texture parameter would, for example, be constrained to a selection of maps of the surface of Earth 500, which when applied to the spherical object geometry appear as shown in FIG. 5A. If this constraint is not applied, and spherical object 502 is rendered without the requisite texture, object 502 appears as simply a ball as shown in FIG. 5B. Without maintaining the RIGOHR texture constraint, human recognition factors are minimized and object 502 is unlikely be to identified by a human user as "planet earth".

Figure 6A:
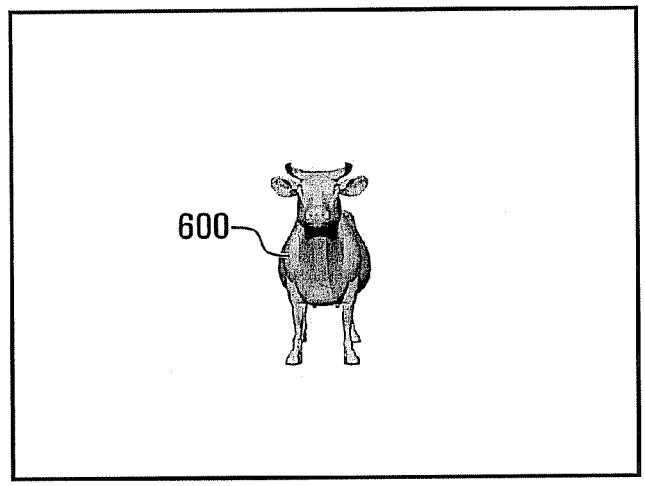
FIG. 6A is a camera perspective illustration of a rendered 2-dimensional image of a cow where geometry distortion is at a defined default.
Figure 6B:
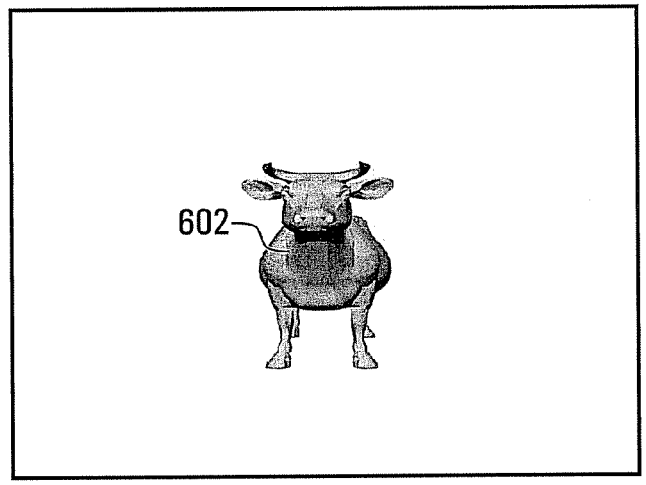
FIG. 6B is a camera perspective illustration of a rendered 2-dimensional image of a cow where the geometry is distorted along XYZ axes within predefined thresholds.
Figure 6C:
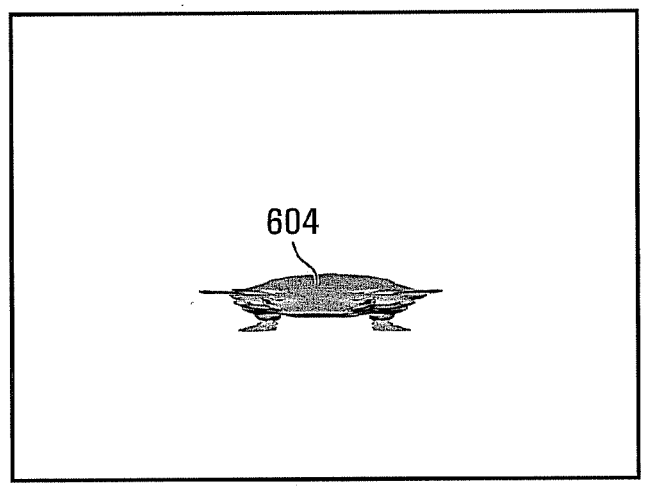
FIG. 6C is a perspective image of a cow where the geometry is distorted beyond permissible thresholds.

FIGS. 6A, 6B and 6C illustrate RIGOHR transformation limits for an object. FIG. 6A is a camera perspective illustration of a rendered 2-dimensional image of a cow 600 where geometry distortion is at a defined default. FIG. 6B is a camera perspective illustration of a rendered 2-dimensional image of cow 602 where the geometry is distorted along XYZ axes within predefined thresholds. FIG. 6C is a perspective image of cow 604 where the geometry is distorted beyond permissible thresholds. Accordingly, cow 600 can be randomly distorted along any one or more of the X, Y and Z axes within predefined thresholds to arrive at cow 602 which is still recognizable by a human user. However, when the distortion thresholds of RIGOHR are exceeded, as illustrated in cow 604 in FIG. 6C, there is a degradation of human recognition factors, and cow 604 may not be identifiable as such by a human user.

Figure 7A:
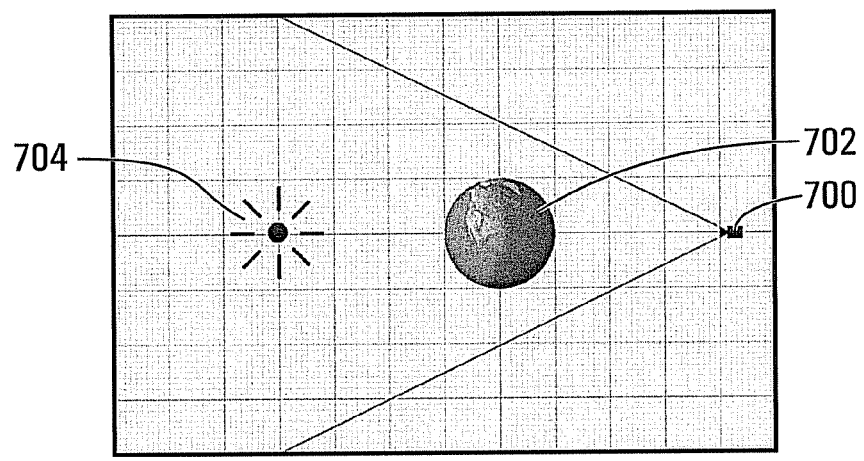
FIG. 7A is a top-down perspective illustration of a rendering environment with a light source positioned directly behind an Earth object.
Figure 7B:
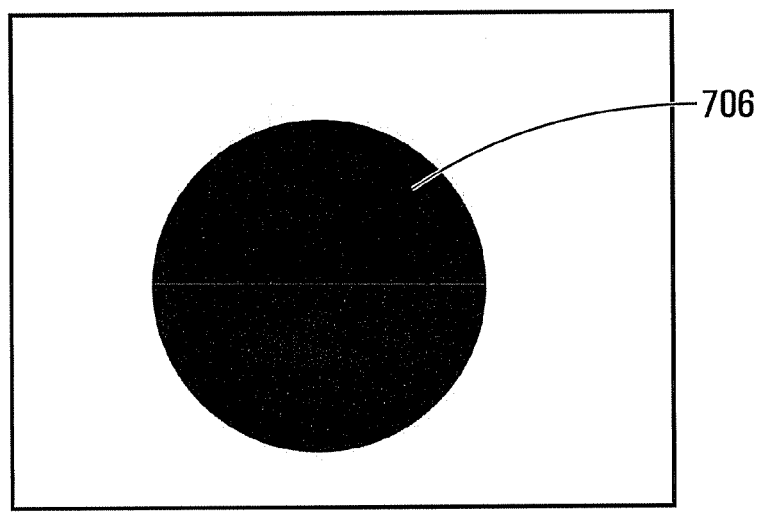
FIG. 7B is an illustration of the rendered 2-dimensional image resulting from the environment illustrated in FIG. 7A.
Figure 7C:
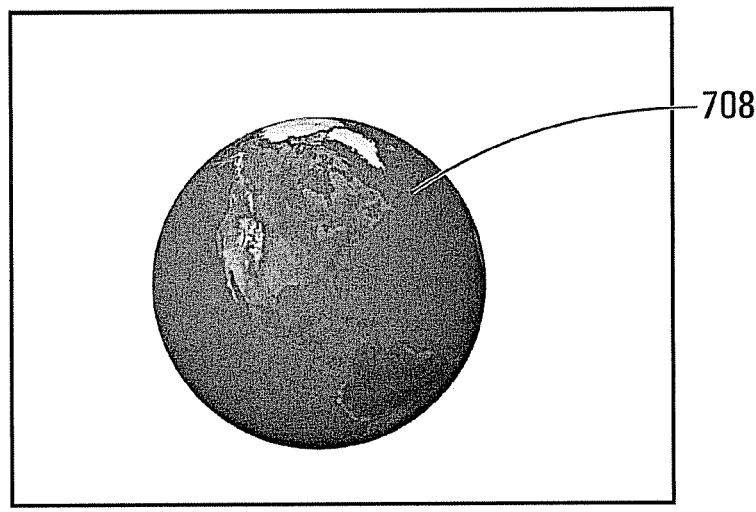
FIG. 7C is camera perspective illustration of a rendered 2-dimensional image of the Earth resulting from lighting maintained within predefined thresholds.

FIGS. 7A, 7B and 7C demonstrate lighting threshold and constraint parameters of the RIGOHR which should be maintained in order to facilitate human recognition factors. FIG. 7A is a top-down perspective illustration of a rendering environment with a light source 704 positioned directly behind an "Earth" object 702. Earth object 702 is in front of camera 700. Where the lighting values selected for the rendering environment in FIG. 7A exceed thresholds defined in RIGOHR, this results in the image of FIG. 7B. FIG. 7B is an illustration of the rendered 2-dimensional image resulting from the environment illustrated in FIG. 7A. In FIG. 7B, there appears black sphere 706 which can no longer be easily identified by a human user as "planet earth". FIG. 7C is a camera perspective illustration of a rendered 2-dimensional image of Earth object 708 resulting from lighting maintained within predefined RIGOHR thresholds. Accordingly, Earth 708 is identifiable as such by a human user.

FIGS. 8A, 8B, 8C and 8D illustrate the application of an environmental effects threshold parameter in RIGOHR, which in this case is the depth of field range. The RIGOHR depth of field parameter threshold should be maintained for all objects in the environment in order to maintain human recognizeability.

Figure 8A:
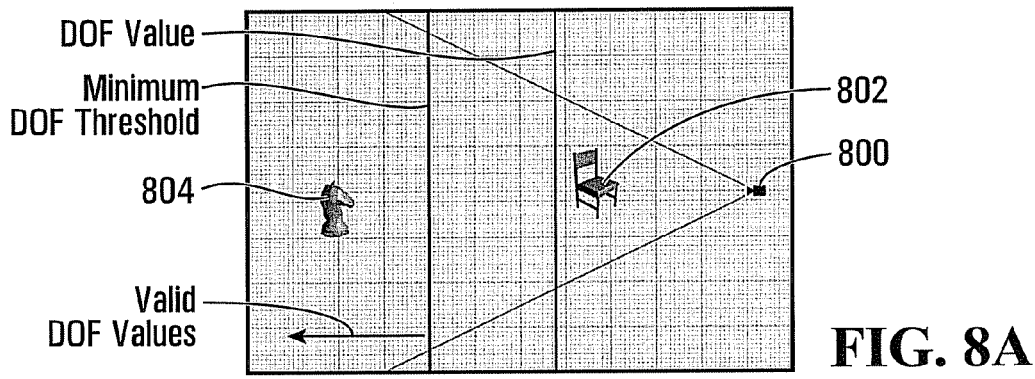
FIG. 8A is a top-down perspective illustration of a rendering environment where a depth of field threshold is violated.
Figure 8B:
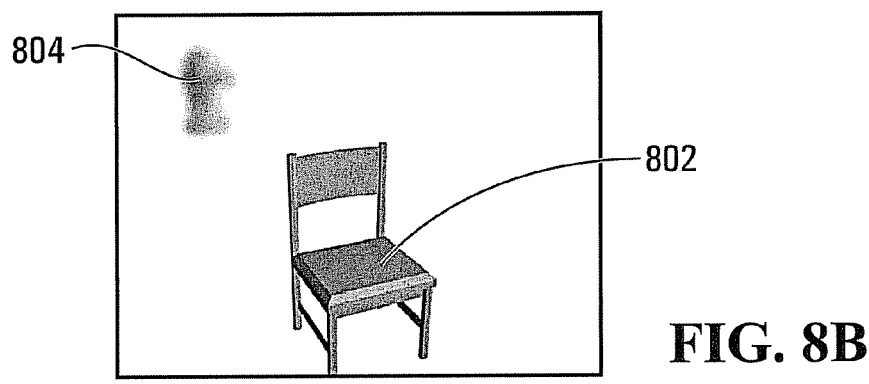
FIG. 8B is a camera perspective illustration of a rendered 2-dimensional image resulting from the rendering environment of FIG. 8A.
Figure 8C:
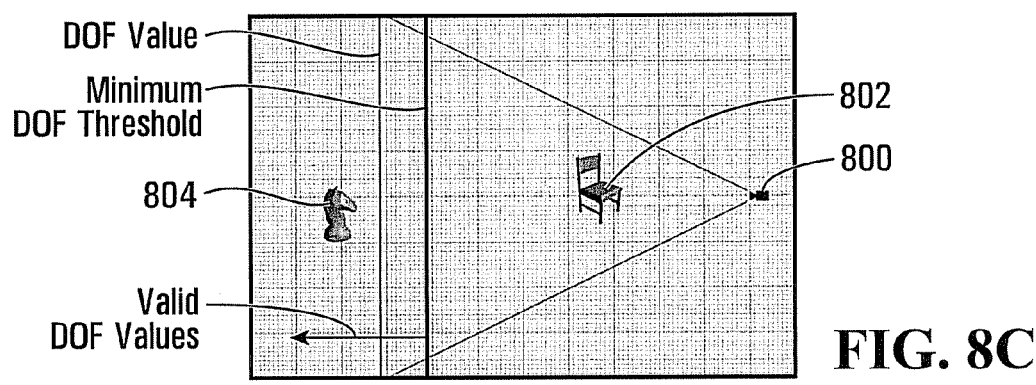
FIG. 8C is a top-down perspective illustration of a rendering environment where the depth of field threshold is maintained.
Figure 8D:
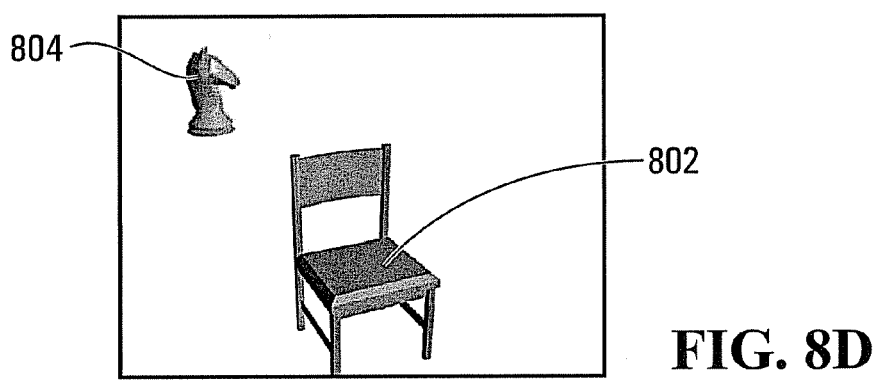
FIG. 8D is a camera perspective illustration of a rendered 2-dimensional image resulting from the rendering environment of FIG. 8C.

FIG. 8A is a top-down perspective illustration of a rendering environment with a chair object 802 nearer camera 800, and a chess knight object 804 farther from camera 800 where the depth of field threshold is violated. FIG. 8B is a camera perspective illustration of a rendered 2-dimensional image resulting from the rendering environment of FIG. 8A. FIG. 8B includes chair 802 and chess knight 804. As a result, chess knight 804 in the resulting composite image has become obscured and human recognition factors are reduced. FIG. 8C is a top-down perspective illustration of a rendering environment where the depth of field threshold is maintained. FIG. 8D is a camera perspective illustration of a rendered 2-dimensional image resulting from the rendering environment of FIG. 8C. When the depth of field threshold is maintained, as shown in FIG. 8C, chess knight 804 is more readily identifiable in the resulting image as shown in FIG. 8D.

FIGS. 1A to 8D are provided herein to demonstrate how a single rendering parameter of an object (such as a pencil, or the planet Earth) can be varied so as to lose (or gain) human recognizeability. The images shown in these figures are not intended to be examples of exemplary output of the invention. Such exemplary output according to various embodiments of the invention is provided in FIGS. 12A, 12B and 13.

Each RIGOHR also comprises metadata providing categorization of the object. Such categorization metadata may be comprised of multiple descriptors that apply to the object represented. For example, a RIGOHR which contains the model of a Chihuahua may be categorized by metadata such as "Chihuahua", "dog", "canine", "animal", "mammal", "furry", etc. Multiple RIGOHR may share metadata elements with the same descriptors—for example, one RIGOHR representing a poodle and the other a Chihuahua may share the common categorizations of "dog", "canine", "animal", "mammal", etc. This provides further variability as the server may select from a plurality of synonymous objects. Further categorization metadata may be associated with rendering parameters, for example material property texture maps of spots or stripes can be categorized with tags such as "spotted" and "striped". Categorization metadata in a RIGOHR may be multilingual, with descriptors provided for as many languages as desired. Categorization metadata may be referenced to generate text prompting selection of objects (in any supported user language of choice).

A RIGOHR may also comprise qualitative metadata providing threshold and constraint parameters for selection, as well as statistical results. Examples of qualitative metadata may include parameters for age, sex (male or female), or culture (including geographic location, religion, language, etc). Such metadata may be optionally referenced by the server in selecting appropriate RIGOHR based on user identity or preferences. For example, a RIGOHR representing a moose might not be easily recognizable by a user in Africa—therefore preferably not selected for identification by users whose internet address originates from that region. Statistical results of success and failure of users to identify a RIGOHR may be stored in the qualitative metadata to refine the selection parameters.

RIGOHRs can be initially constructed by human operators who set the rendering parameters, categorization, and qualitative metadata. This can alternatively be done automatically, but may not be as advantageous as it could require a significant statistical sampling of user input prior to applying the RIGOHR to authorization applications. For example, RIGOHR may be deployed in an environment without requiring authorization and the statistical data produced by multiple users applied to define the RIGOHR parameters and metadata. In an embodiment where the initial RIGOHR states are defined by human operators, the statistical data collected from user authorization attempts may still be applied to automatically refine the parameters and metadata.

A software program on a server can reference the metadata to select a plurality of object models and set the rendering parameters for each object randomly varied within the thresholds and constraints provided by the metadata. This information can be passed to the rendering system, which can comprise software or hardware designed to render 2D images from the 3D model data and parameters provided.

In one embodiment, the rendering system can be configured to output mask data indicating the 2-dimensional regions where each object is visible in the image (in addition to the description as passed by the object metadata). The mask areas can be reduced to quantized vector descriptors of the region of the image occupied by each object (and wherein the object is not occluded by any overlapping geometry in the Z-buffer) as well as the object description, and this information is stored as image metadata. The image produced can be assigned a unique identification code, and the associated image metadata can also be indexed by means of this identification code.

The 2-dimensional image and associated metadata produced by the rendering system are stored on the server as files or within a database system. The image metadata may be appended to the image file. In one embodiment, images are stored in files and the image metadata in a database system.

When a user request for authentication is received by the server, the image metadata is referenced to retrieve and transmit an appropriate image to the client system.

In some embodiments, the present invention can provide a rendering system where the entire environment is generated automatically, with random variations defined by the RIGOHR. In addition, the present invention can maintain human recognition factors for all objects represented in the image regardless of the randomized nature of the scene.

When the user request is for human interaction authentication alone, any image with a random set of objects is selected and transmitted by the server to the client. The image metadata is generally not transmitted to the client system, and may be retained only on the server. However, text generated from the image metadata object descriptions are transmitted to the client system in order to provide prompting for the user to select a subset of objects in the image.

When the user request also requires user identity authentication, the user name is transmitted to the server. The server can maintain a list of user names and associated shared secret information. The server can thereby reference the image metadata to select an image guaranteed to contain the objects which comprise the shared secret of the requesting user (in addition to any other objects depicted). This image is transmitted to the client system without any image metadata information or prompts, as the user already knows which objects must be selected as a function of their shared secret.

The user selections (e.g. mouse clicked points on the image on a computer screen) are transmitted to the server and compared against the image metadata to determine if the subset of objects required for authentication (and only this subset) have been successfully identified. In this exemplary presently preferred embodiment, the selected X (horizontal) and Y (vertical) coordinates returned by the client system should all fall within the regions defined in the image metadata for the desired objects for successful identification.

In another aspect, the rendering system can be configured to output random alphanumeric labels in the image for each object (for example "A", "7", "C12", "99B"). In this way the user can select objects in the image by typing the appropriate label instead of clicking on the image. This method can be implemented for client applications where mouse (or other pointer) input is not available for selection of an X and Y coordinate on the image.

If the objects have been successfully identified, the server authorizes access to services. If the objects were not identified, the server provides notification of failure to the client and denies further access. In order to gain authorization, the user will be required to re-initiate the authorization process.

In the implementation example described above, the images have been generated by the present invention prior to the request for authentication being received from the client system. This methodology favors less processing required on the server to respond to each authentication request at the cost of storage capacity. This mode of operation can be described as pre-caching of the images and associated metadata. In this mode of operation, an image may preferably be discarded once it has been used for an authentication attempt. Alternatively, the system can be implemented in another mode such that the rendering of the image occurs in response to the authentication request. In this instance, the rendering of the image is initiated by the user request for authentication. In this mode, the resulting image need not be stored on the server (it can be immediately transmitted to the client system) and only the image metadata need be retained (for the purpose of determining the successful selection of objects in the image).

Further details regarding the operation of exemplary embodiments of the invention are described below.

Figure 9:
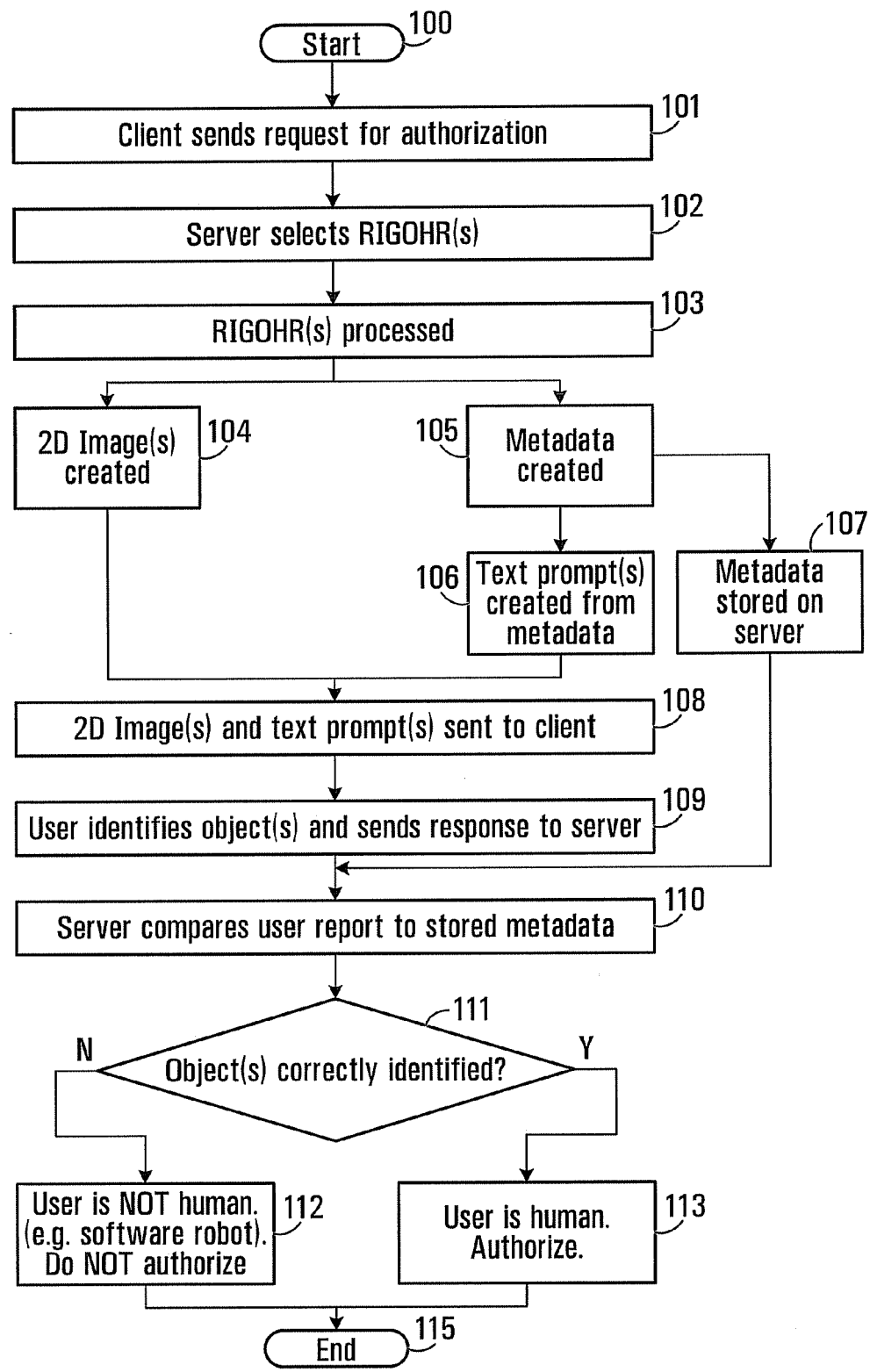
FIG. 9 is a flowchart of the operation of an illustrative embodiment for distinguishing a human from an automated process.

In one embodiment, as illustrated in FIG. 9, there is provided a method of network authentication comprising selecting one or more RIGOHR to generate a 2-dimensional image or images, and image metadata, and transmitting the 2-dimensional image or images, without the image metadata to a user for authentication. This embodiment is used when a client system requires only authentication of human interaction (i.e. distinguishing between a human user and an automated process). In this embodiment, an image, or images, generated from any one or more RIGOHR can be transmitted along with text generated from the image metadata to prompt the user selection of a subset of objects. The user selection(s) can then be returned to a server and compared against the image metadata to determine if the object or subset of objects, as prompted to the user, have been successfully identified.

At step 100, the method illustrated in FIG. 9 is commenced. At step 101, a client sends a request to a server for authorization. At step 102, the server selects one or more RIGOHR. At step 103, the variable and randomizeable rendering parameters are processed for each RIGOHR to generate a 2-dimensional image (at step 104). This is done by mapping the coordinates of the three dimensional image onto a two dimensional coordinate system (generally in pixel units) to create a digital two dimensional image. Typically, the 2-dimensional image has a two-dimensional display surface. Optionally, there may be provided the perception of a third dimension effected by visual clues to the user.

At step 105, associated metadata is created for the 2-dimensional image. The associated metadata includes categorization of the image for authentication of the user. For example, metadata for a particular image may be stored as "sitting spotted cat" or "blue flying saucer".

At step 106, one or more text prompts are created from the metadata. The text prompts are used to gather input from the user which is used in the authentication process described herein. For example, a user may be prompted to identify "select the sitting spotted cat". At step 107, the metadata is stored on the server. The metadata is generally not transmitted to the client.

At step 108, the server transmits the 2-dimensional image to the client without the associated image metadata (which generally remains stored solely on the server). The text prompt(s) created at step 106 are also transmitted to the client. As noted above, the prompts need not be text prompts. Voice prompts could be used in the place of text prompts, for example. More than one 2-dimensional image can be generated (either from the same RIGOHR selection set or from a different set). In this case, the plurality of images would then be sent to the client at step 108.

For example, a 2-dimensional image of two trains could be generated at step 104, the first train being longer than the other. Metadata created at step 105 associated with the first train could be "longer train" and metadata created at step 105 associated with the second train could be "shorter train". The text prompt created at step 106 could be "which train is the longer train?".

At step 109, the user identifies the objects illustrated in the one or more 2-dimensional images in response to the text prompt(s), and sends the response to the server. At step 110, the server compares the user response to the metadata stored in step 107.

At step 111, the server determines whether the object illustrated by the 2-dimensional image(s) has been correctly identified and/or whether the question posed by the text prompt(s) has been correctly answered. If yes, at step 113, the user is authenticated as a human. If no, at step 112, the user is not authorized as a human and authentication is not provided. The method terminates at step 115.

In one embodiment, when a client requires authentication of human interaction only, one or more images are generated from one or more RIGOHR(s) and are then transmitted along with text prompt(s) generated from image metadata to prompt the user to make one or more selection(s), which can be a selection of a subset out of a larger set of objects. The user selection(s) can then be returned to the server and compared against the image metadata to determine if the subset of objects as prompted have been successfully identified.

Figure 10:
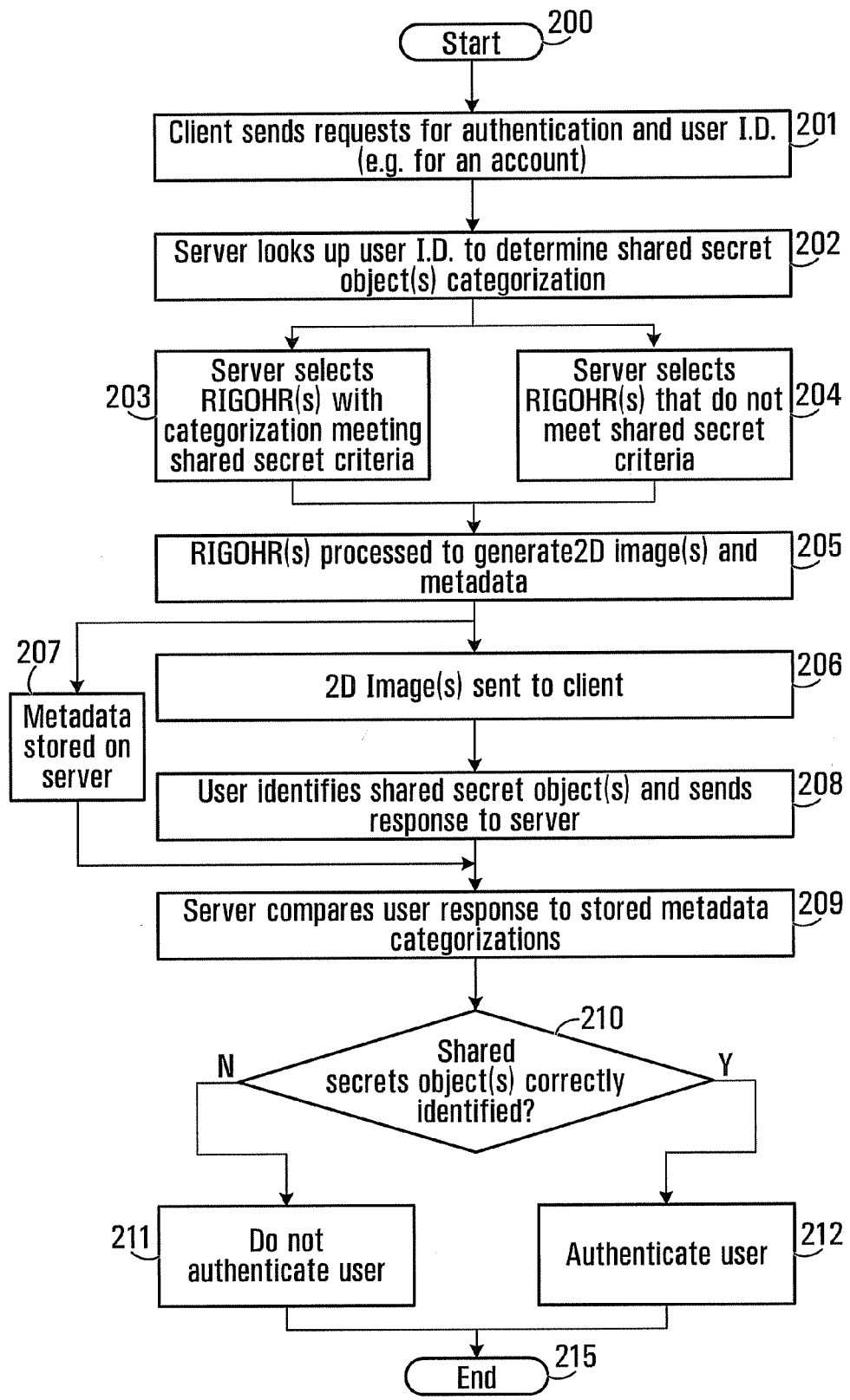
FIG. 10 is a flowchart of the operation of an illustrative embodiment for distinguishing a human from an automated process and for authenticating a user's identity.

In an embodiment when a client requires human interaction authentication as well as authentication of user identity, the method of FIG. 10 may be employed. In this case, the 2-dimensional images transmitted by the server to the client include a shared secret object amongst the plurality of objects in the image. In this instance, no text prompt is generated as the user already knows the objects which require selection as a function of their shared secret. The user selections can then be returned to the server and compared against the image metadata to determine if the shared secret objects have been successfully identified.

At step 200, the method illustrated in FIG. 10 is commenced. At step 201, a client sends a request for human authentication and user identification to a server. Typically, a user ID would be transmitted to the server along with the request. At step 202, the server looks up the user ID to determine shared secret object(s) categorization. For example, a shared secret(s) categorization may be "mammals" (meaning that the user will ultimately be required to identify one, more or all of the mammals in an image of various animals). Alternatively, the shared secret(s) categorization could be "old human male" (meaning that a user will ultimately be required to identify which objects in an image of various objects illustrate "old human males").

At step 203, the server selects RIGOHR(s) with categorization meeting the shared secret criteria. At step 204, the server selects RIGOHRs that do not meet the shared secret criteria. The RIGOHR(s) in step 204 are used to populate an image with objects that do not meet the shared secret criteria so that a selection from a number of objects can be made by the user.

At step 205, the RIGOHR(s) from steps 203 and 204 are processed to generate 2-dimensional images and associated metadata. At step 206, the 2-dimensional images are sent to the client. At step 207, the associated metadata is stored on the server. As with the method in FIG. 9, the associated metadata is used to categorize the image for authentication of the user.

At step 208, the user identifies the shared secret objects from among the 2-dimensional images sent to the client in step 206. If the objects have been successfully identified by the user of the client system the server can authorize access to services. If the objects were not identified, the server can provide notification of failure to the client and deny further access. For example, the client could have been sent ten images representing objects of a whale, a bird, a frog, an elderly man, a house, an airplane, a kangaroo, a telephone, a pen, and a dollar bill. If the shared secret was "mammal", the user would be required to identify through computer mouse interaction (or otherwise), the whale, the elderly man, and the kangaroo in order to be authenticated by the server. If the shared secret was "old human male", then the user would be required to identify only the elderly man in order to be authenticated. The shared secret categorizations could be layered. For example, the user could first be required to identify the mammals, and then be required to identify which of the mammals comprise elderly human males. As such, the system and method described herein has a great deal of variability in operation.

At step 209, the server compares user responses to the stored metadata categorizations. If the shared secret object(s) are identified correctly, the user is authenticated at step 212. If the shared secrets object(s) are not correctly identified, the user is not authenticated at step 211. The method terminates at step 215.

Because images generated by embodiments of the present invention are highly variable, users should not generally receive the same authentication image twice. As a result, current techniques of image metric comparison, brute force, and dictionary attacks become much less effective and in some cases ineffective as means of exploitation. An additional effect is that authentication selections are only relevant to a given image generated at a specific point in time, and therefore automated logging methods become unproductive since they will not provide authentication for future attempts.

The identification of objects in the images generated by embodiments of the present invention is a trivial task for humans, yet providing an automated means of recognizing specific objects in such images remains a complex and as yet unresolved problem. This renders software robots substantially ineffectual in defeating the authentication.

Since shared secrets are graphical in nature according to embodiments of the present invention, automated linguistic dictionary attacks can be rendered impotent. In addition, objects in an image may be selected by a user by means of coordinates (such as clicking a computer mouse to select a point on a computer screen) which can serve to defeat keystroke logging attacks.

Figure 11:
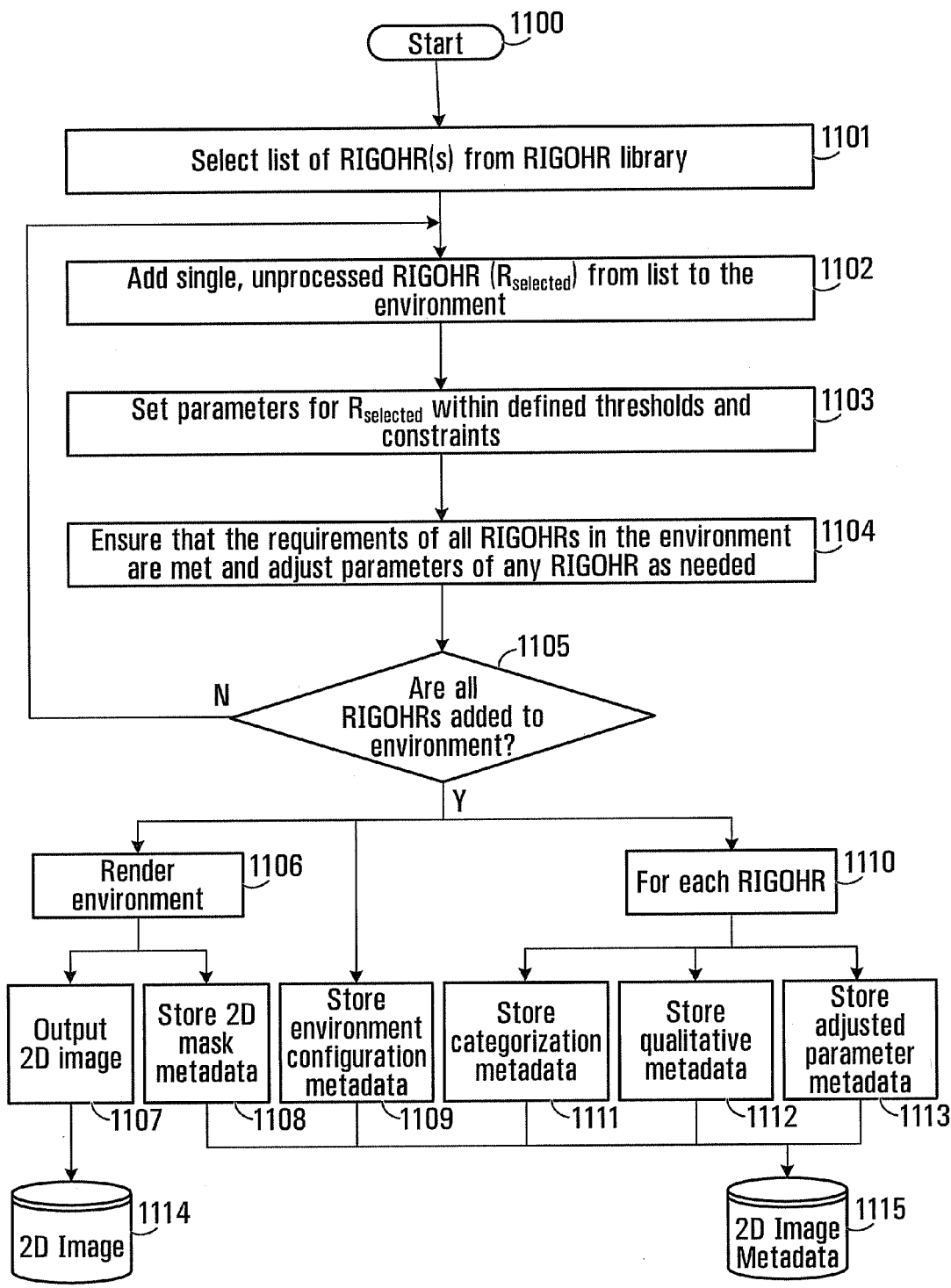
FIG. 11 is a flowchart of the operation of an illustrative embodiment for generating a plurality of 2-dimensional images and associated image metadata.

FIG. 11 is a flowchart of the operation of an illustrative embodiment for generating a plurality of 2-dimensional images and associated image metadata. The method is commenced at step 1100. At step 1101, a list is selected from a RIGOHR library. At step 1102, a single, unprocessed RIGOHR ($R_{selected}$) is added to the environment from the list. At step 1103, parameters for $R_{selected}$ are randomly varied to be within pre-defined thresholds and constraints. At step 1104, a check is made to ensure that the requirements of all RIGOHRs in the environment are met. This is because the rendering environment is collectively defined by all RIGOHRs selected, and should satisfy the requirements of every RIGOHR represented. For optimization purposes, selection of RIGOHRs with incompatible requirements may be avoided. For example, if two RIGOHRs were to both require a particularly large scale and minimum visible area, it may not be possible to accommodate both within the same scene. As such, the system examines these parameter requirements at the time of selection and excludes one of the objects from being chosen rather than putting them both in the scene such that the conflicting parameter requirements cannot be resolved. In practice, however, such cases should be extremely rare.

A recursive adjustment is made of any parameters of any RIGOHRs as needed. At step 1105, a check is made regarding whether all RIGOHRs have been added to the environment. If not, steps 1102, 1103 and 1104 are repeated.

Note that a single RIGOHR may be recursively selected. This alternative embodiment is illustrated in connection with FIG. 13, which is described below.

Once all RIGOHRs have been added to the environment, the environment is rendered at step 1106. At step 1107, the rendering system (which can comprise software or hardware designed to generate 2-dimensional images from 3-dimensional data), is used to output a 2-dimensional image of the environment.

At step 1108, the 2D mask metadata is stored. As described more fully in connection with FIGS. 12C and 12D, the 2D mask metadata are descriptors of regions of the image where an object remains visible (and not occluded by any other overlapping objects). This data is associated with the descriptors for the object being masked. Such a mask can be stored as a simple 1 bit (black and white) graphic where the visible areas of the object are black and the rest of the image remains white. However, to reduce the size of the mask metadata these regions can be described with bounding points (i.e. like an outline). These points may optionally be quantized to reduce the number of points required.

The mask data can be referenced by the server when the user response returned includes coordinates (i.e. the user has selected objects within an image by means of a pointing device). The server can correlate the user returned coordinates with the 2D mask metadata to determine which objects within the image have been selected.

At step 1109, environment configuration metadata is stored. Environment configuration metadata stores the settings of global parameters used for the rendering of the scene, as opposed to the parameter settings for a given RIGOHR within the scene. Examples may include the settings for the projection (camera) and environmental such as depth of field, motion blur, lens flares, fogging, shadows, etc. Environment configuration metadata serves as a record and reference to the environment settings at the time of rendering of the image.

This data may be referenced post authorization, as described below, in order to automatically refine the parameters of the RIGOHR used to source an image and facilitate improved human recognition factors.

Categorization metadata, stored at step 111, is used to uniquely identify objects represented in the scene, and is sourced from the RIGOHR categorization metadata. The categorization metadata is comprised of a base descriptor and may be extended based on any categorizations associated with RIGOHR rendering parameters as applied. So if a RIGOHR of a cat object is used and the rendering parameters of striped texture map, brown and white coloration, and sitting transformation are selected during processing this can result in a categorization metadata of "Sitting striped brown and white cat". Since the RIGOHR may contain multilingual categorization metadata, this may be passed as well providing descriptors in multiple languages for each object represented. Each categorization may be associated with 2D mask metadata to identify the location of the described object within the image, as well as adjusted parameter and qualitative metadata for that object.

Qualitative metadata, stored at step 1112, is sourced from any RIGOHR qualitative metadata, and may include parameters related to age, sex, culture, geographic location, religion, language, etc. Qualitative metadata may be referenced post authorization, as described below, in order to automatically refine the parameters of the RIGOHR used to source an image and facilitate improved human recognition factors.

Adjusted parameter metadata, stored at step 113, contains the RIGOHR rendering parameter settings used for the generation of the image. The RIGOHR rendering parameters are thresholds and constraints, and are not set to a given value until the processing phase. The adjusted parameter metadata, therefore, acts as a record of how these rendering parameters were actually configured in order to generate the image. Adjusted parameter metadata may be referenced post authorization, in order to automatically refine the parameters of the RIGOHR used to source an image and facilitate improved human recognition factors.

The 2-dimensional images and associated metadata produced by the rendering system are stored on the server as files or within a database system as shown in steps 1114 and 1115. The image metadata may be appended to the image file. In one embodiment, images are stored in files and the image metadata is stored in a database system. When a user request for authentication is received by the server, the image metadata is referenced to retrieve and transmit appropriate images to the client system.

Figure 12A:
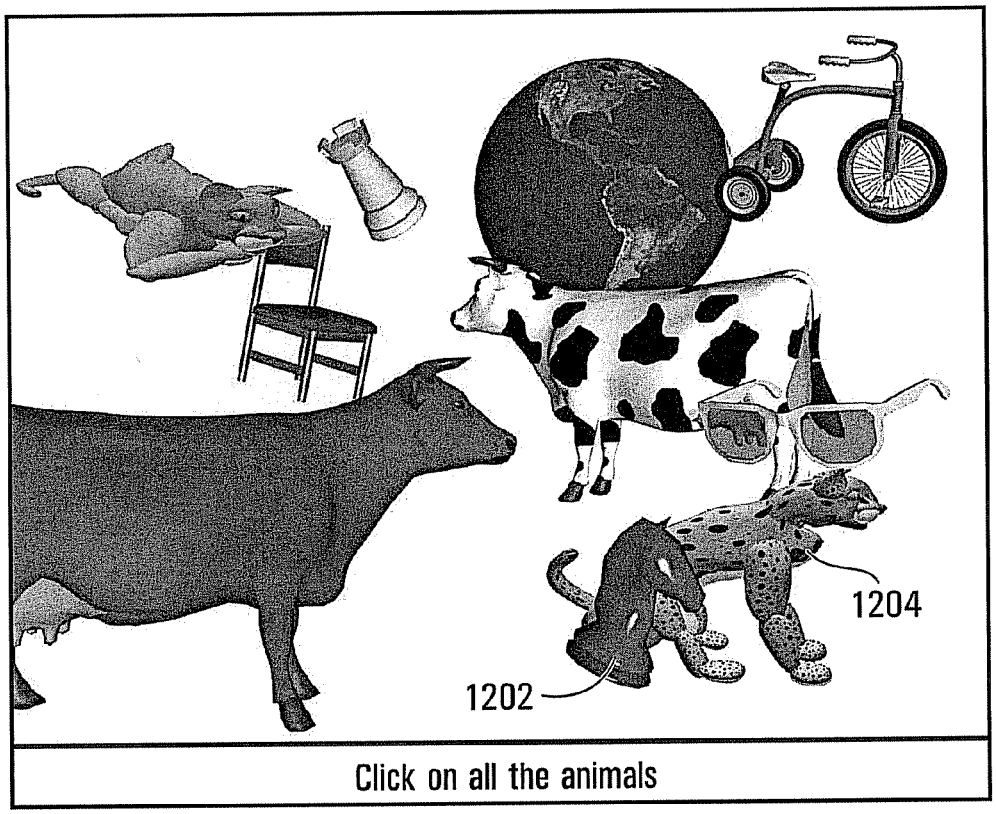
FIG. 12A is a computer screen display of an image of multiple objects output in accordance with an embodiment of the present invention.

The databases accessed at steps 1114 and 1115 (not shown) are not intended to represent that a fixed database of images is created in accordance with the invention. Instead, the images stored at steps 1114 and 1115 are intended to represent pre-cached images. The present invention is intended to prevent an attacker from compiling a dictionary of images from which to compare. Unlike prior art systems, the present invention randomly generates as many unique images as required. In some embodiments, this is done at the time user authentication is requested. In other embodiments, for optimization purposes, a plurality of images is generated for one-time use and stored in a pre-cache. In this latter mode of operation, pre-cached images may be discarded once they have been used for an authentication attempt FIG. 12A is a computer screen display of images of multiple objects output in accordance with an embodiment of the present invention. When a user request to the server is for the purpose of authenticating human interaction alone, a set of images such as the one illustrated in FIG. 12A is selected and transmitted by the server to the client. The image metadata is generally not transmitted to the client system, and may be retained only on the server. However, text generated from the image categorization metadata are transmitted to the client system in order to provide prompting for the user to select a subset of objects in the image. For the set of images shown in FIG. 12A, an example of such a text prompt could be "Click on all the animals".

When a user request to the server also requires user identity authentication, the user name is transmitted to the server. The server can maintain a list of user names and associated shared secret information. The server then references the image metadata to select a set of images which contain the objects meeting the shared secret categorizations of the requesting user (in addition to any other objects depicted). This image is generally transmitted to the client system without any image metadata information or prompts, as the user is required to select one or more images as a function of their shared secret. In this case, the prompt "Click on all the animals" would not appear in the computer screen display. However, the user (as a function of the shared secret) would be required to select all of the animals in the display in order to be identified by the server.

The user selection(s) are transmitted to the server and compared against the image metadata to determine if the subset of objects required for authentication (and only this subset) have been successfully identified. In one embodiment, the selection of X (horizontal) and Y (vertical) coordinates returned by the client system (using an input device such as a pen or mouse to select a point) should all fall within the 2D mask regions defined in the image metadata for the desired objects for successful identification.

Figure 12B:
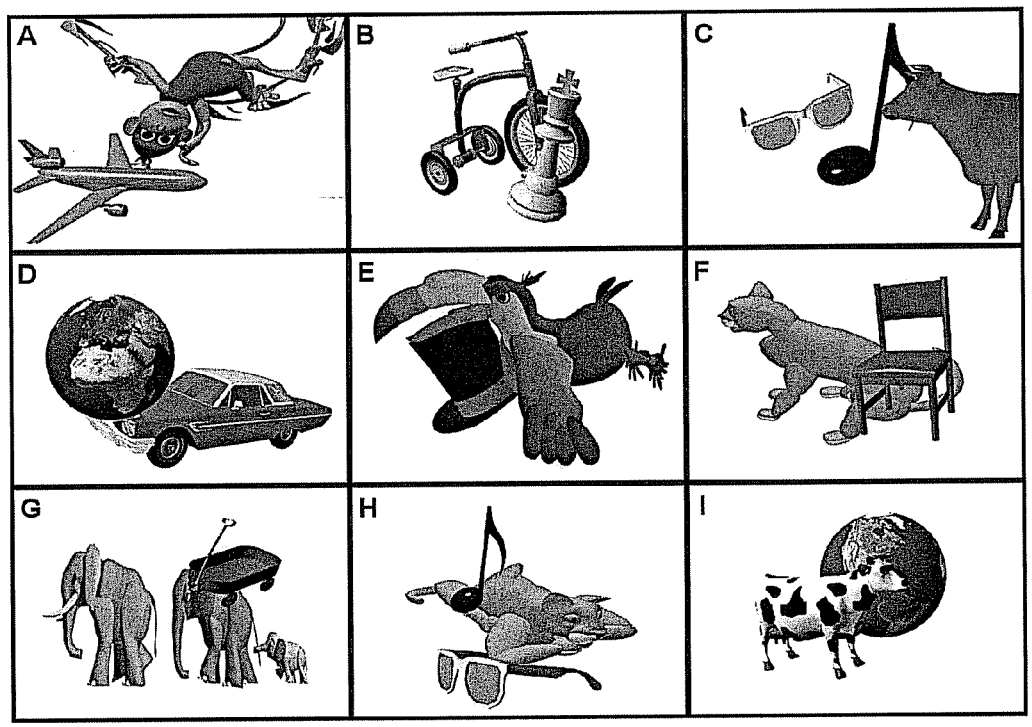
FIG. 12B is a computer screen display of images of multiple objects output in accordance with another embodiment of the present invention.

FIG. 12B is a computer screen display of images of multiple objects output in accordance with another embodiment of the present invention. In this aspect, a plurality of images of various objects may be selected by the server and transmitted to the user for authentication. Successful authentication requires the user to select all images containing the required objects (by means of either coordinate or label selection). As shown, alphanumeric labels are assigned to each group of images. In this way a user can select objects in the image by typing the appropriate label instead of selecting coordinates on the image. This method can be implemented for client applications where coordinate selection (using an input device such as a pen or mouse to select a point) is not desirable or supported. The embodiment of FIG. 12B may also be used to authenticate user identity.

In another embodiment, a user may be prompted for multiple steps of object identification. For example, in reference to the images shown in FIG. 12B, a user may be prompted as a first identification step to "Select all chess pieces" followed by a prompt to "Select all vehicles" as a second step.

If the objects have been successfully identified by a user, the server authorizes access to services. If the objects were not properly identified, the server provides notification of failure to the client and denies further access. In order to gain authorization, a re-initiation of the authorization process can be required.

The regions where one or more objects remain visible (and not occluded) are aspect of the image metadata—specifically the mask data portion of the image metadata. For example, in FIG. 12A knight chess piece 1202 is shown as overlapping the backside of sitting spotted cat 1204. If a user were to click on knight chess piece 1202 in the overlapping region, the system should be able to determine that sitting spotted cat 1204 was not being selected since it is being occluded in the overlapping region. The mask data describes the area of the image (basically a hotspot) occupied by each object.

Figure 12C:
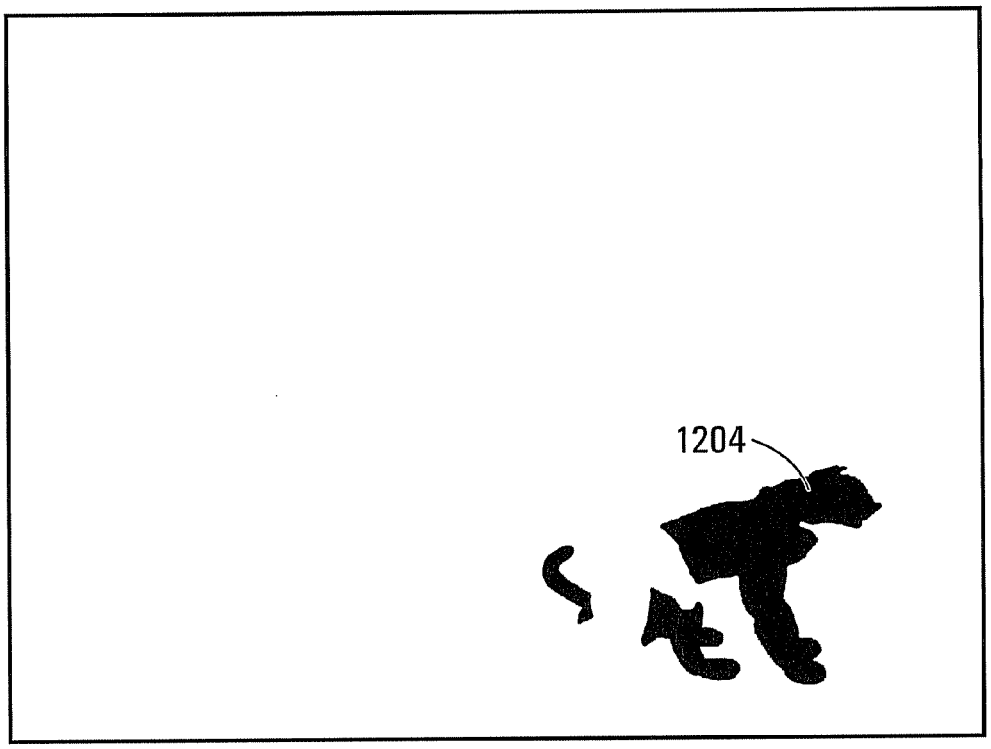
FIG. 12C is an illustration of a two dimensional mask of a sitting spotted cat of FIG. 12A.
Figure 12D:
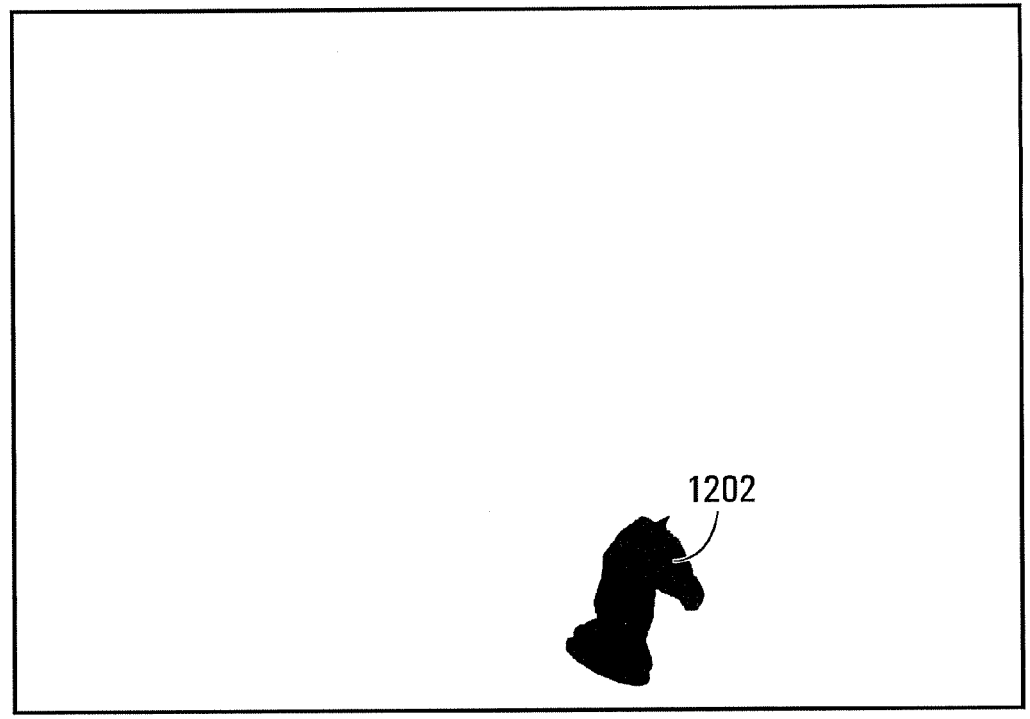
FIG. 12D is an illustration of a two dimensional mask of the chess knight of FIG. 12A.

FIG. 12C is an illustration of a two dimensional mask of sitting spotted cat 1204 of FIG. 12A. FIG. 12D is an illustration of a two dimensional mask of chess knight 1202 of FIG.

12A. In one embodiment, to save memory, the system quantizes the overlapping areas by simplifying their boundaries. The rendering parameters of RIGOHR take care of preventing overlaps of critical geometry of sitting spotted cat 1204 and chess knight 1202 and making sure enough of an object's area is visible and recognizable. Accordingly, RIGOHR rendering parameters include the threshold and constraint values for randomization for an object.

Where, as FIG. 12A, there are multiple objects in a single image, the metadata would include descriptors for each object represented (potentially in multiple languages) and where each is represented in the overall image (i.e. the 2D mask regions such as those shown in FIGS. 12C and 12D).

In addition, the 2-dimensional image data can (optionally) include a record of how the parameters were set for each object when rendered, what the settings for the environment were (i.e. lights, fog, depth of field, etc.—basically the "camera" settings). This would be referenced later if it was intended that the parameters of the RIGOHR be refined automatically based on user success/failure. For example, if a cat rendered with a certain size were always being failed to be recognized, the threshold size for the cat object could be adjusted to ensure it was rendered at a preferable scale to enhance recognition (i.e. a potential recognition issue could be addressed by altering the settings of the RIGOHR based on user feedback).

Another aspect of the metadata can be the qualitative data. This is to address issues such as preferred region, religion, age, etc. So if users in a particular region of the world south of the Equator were always failing to identify a moose object, the qualitative metadata of the source RIGOHR can be set to exclude that region during the selection phase. Having this exclusion qualitative metadata associated with the image also applies for instances where a large number of authentication images have been rendered in advance (i.e. pre-cached) and selection issues are sought to be avoided based on user criteria.

Thus, use of image metadata, qualitative metadata, environment configuration metadata, and adjusted parameter metadata can help in the refinement of RIGOHR parameters.

In another aspect, user data regarding authorization success and failure can be stored on the server and associated to the image metadata. The success/failure data may be stored on the server as files or within a database system. The success/failure data may alternatively be appended to the image metadata. A process on the server can analyze the success/failure user data and reference it against the qualitative metadata. If statistical correlations are found between user types and success or failure, the RIGOHR qualitative metadata thresholds and constraints can be modified to refine the selection process to improve recognition. Analysis of the success/failure data can also be referenced against the image metadata describing the configuration of RIGOHR parameters used for image generation. Statistical correlations found between failures and image generation parameters can be used to refine threshold and constraint rendering parameters in the associated source RIGOHR.

Figure 13:
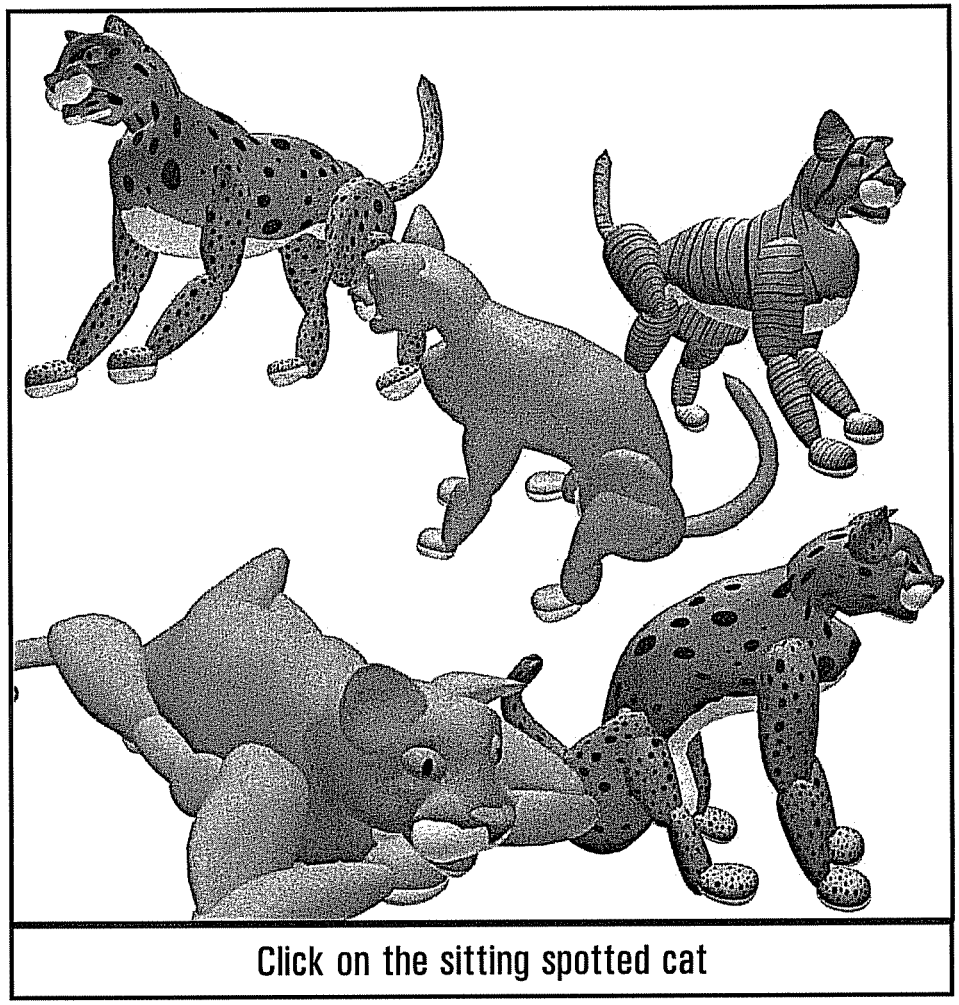
FIG. 13 is a computer screen display of an image of a recursively selected single object output in accordance with yet another embodiment of the present invention.

FIG. 13 is a computer screen display of an image of a single recursively selected object output in accordance with yet another embodiment of the present invention. RIGOHRs are used to generate randomized variations of objects while maintaining the ability of humans to identify the objects in resulting images. As a result, even a single RIGOHR object may be used to create an authentication test.

In the embodiment shown in FIG. 13, a RIGOHR representing a cat has been recursively selected and processed to generate five different images. Multiple parameters have been randomized within the recognition requirements defined by the RIGOHR, resulting in the variety of different cats shown. The RIGOHR contains categorization metadata describing that this object is a "cat", but in addition parameter settings are likewise referenced to generate image metadata for text prompting the user selection of a subset of objects. For example, for FIG. 13 a user could be prompted to select the "Sitting spotted cat". When this instance of the cat was randomized, parameters for "sitting" deformation and a mapping of "spotted" were randomly selected among the plurality of rendering parameters provided by the RIGOHR (in addition to others for position, scaling, lighting, etc). Therefore, as exemplified by the computer screen display of FIG. 13, a single RIGOHR may be used to generate a wide variety of human identifiable objects.

In the above description, for purposes of explanation, numerous details have been set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention, or such details are omitted for the sake of clarity. For example, specific details are not provided as to whether the embodiments of the invention described herein are implemented as a software routine, hardware circuit, firmware, or a combination thereof.

Figure 14:
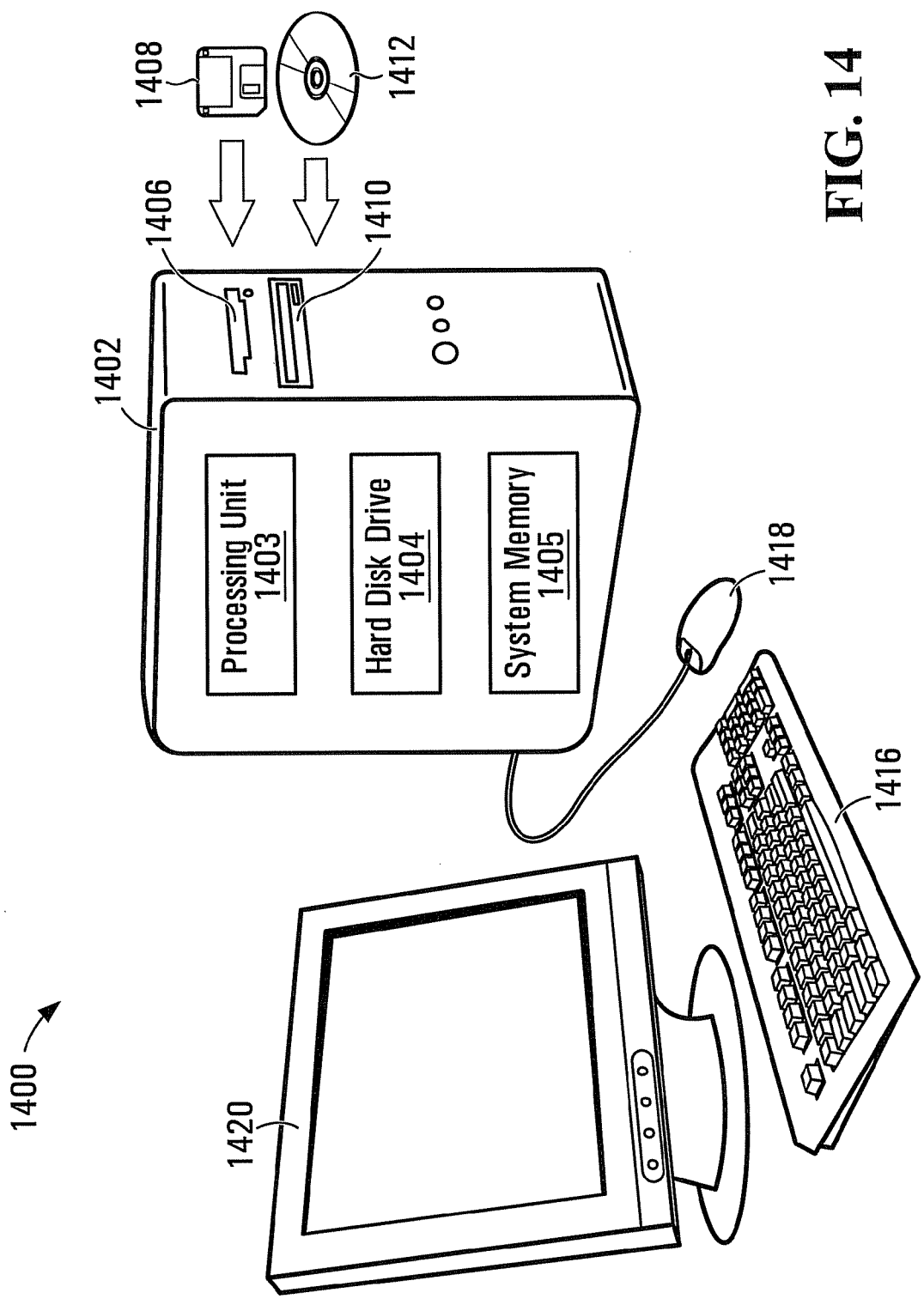
FIG. 14 illustrates an exemplary computing operating environment for embodiments of the present invention.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine readable medium may interface with circuitry to perform the described tasks. As shown in FIG. 14, an exemplary system 1400 for a user to implement the invention includes a general purpose computing device 1402 in the form of a conventional personal computer or the like, including a processing unit 1403, and a system memory 1405. The personal computer 1402 may further include a hard disk drive 1404, a magnetic disk drive 1406 for reading from or writing to a removable magnetic disk 1408, and an optical disk drive 1410 for reading from or writing to a removable optical disk 1412 such as a CD-ROM or other optical media. The drives and their associated computer-readable media provide non-volatile storage of computer readable instructions, data structures, program modules and other data for the personal computer. Other types of computer readable media which can store data that is accessible by a computer can also be used.

A user may enter commands and information into general purpose computing device 1402 through input devices such as a keyboard 1416 or a pointing device 1418. A monitor 1420 or other type of display device is also connected to personal computer 1402. general purpose computing device 1402 may operate in a networked environment using logical connections to one or more remote computers, including a computer server (not shown) of the type described above.

A user can use computer software running on general purpose computing device 1402 to utilize the authentication methods described above. It is not essential to the operation of the invention that a computer server be connected to general purpose computing device 1402. More specifically, the server need not be remote for the invention to be applied. For example, the log-in process on personal computer 1402 can be administered by embodiments of the present invention. Similarly, the log-in process for other local devices such as a Personal Data Assistant (PDA) or Smart phone can be administered by embodiments of the present invention.

In another embodiment of the present invention, the methods described herein are used to authenticate a user of a password protected document.

Embodiments of the present invention could be used in connection with any hardware or software system susceptible to an automated attack of the type described above.

The above-described embodiments of the present invention are intended to be examples only. Alterations, modifications and variations may be effected to the particular embodiments by those of skill in the art without departing from the scope of the invention, which is defined solely by the claims appended hereto.

The invention claimed is:

1. A computer-implemented method for authenticating a user of a computer comprising:
    selecting plurality of 3-dimensional models from a library of 3-dimensional models, each of the 3-dimensional models in the library:
    containing geometric shape data for a respective object in three spatial dimensions; and
    having an associated parameterization comprising a set of one or more rendering parameters specific to said model, each parameter having pre-defined thresholds and/or constraints such that said model remains recognizable by a human,
    wherein the parameterization of one or more of the 3-dimensional models in the library comprises a parameter determining a deformation of the respective geometric shape data for the respective object;
    for each respective selected model, randomly varying the one or more rendering parameters, within the respective pre-defined thresholds and/or constraints for the one or more rendering parameters specific to said model;
    generating a 2-dimensional image based on the result of the varying step, such that each respective selected model remains recognizable by a human in said 2-dimensional image;
    generating metadata based on each respective selected model, and the one or more rendering parameters, wherein the metadata comprises:
        visibility regions identifying where each respective selected model is not occluded in the 2-dimensional image;
        one or more descriptors identifying categorical properties of one of the respective selected models; and
        one or more descriptors identifying visual properties of one of the respective selected models,
        wherein the categorical and visual properties are recognizable by a human in said 2-dimensional image;
    generating a prompt based on at least one of the categorical descriptors and at least one of the visual descriptors;
    communicating the 2-dimensional image for presentation at the computer;
    communicating the prompt for presentation at the computer;
    receiving user input data concerning the 2-dimensional image;
    comparing the metadata and the user input data to determine if the user interacting with the computer is a human user, the comparing comprising a comparison of the user input data with the visibility regions; and
    authenticating or not authenticating based on the result of the comparing step.

2. The method of claim 1, wherein communicating the 2-dimensional image comprises communicating the 2-dimensional image over a computer network to a remote computer.

3. The method of claim 2, wherein the computer network is the Internet.

4. The method of claim 2, wherein the computer network is an Intranet.

5. The method of claim 2, wherein the computer network is a wireless network.

6. The method of claim 1, further comprising:
    storing a shared secret;
    and wherein selecting one or more 3-dimensional models comprises selecting at least one 3-dimensional model based on the shared secret;
    and wherein comparing the metadata and the user input data further comprises determining whether the shared secret and the user input data are identical.

7. The method of claim 2, further comprising:
    storing the metadata at a memory located apart from the remote computer.

8. The method of claim 1, wherein the thresholds and/or constraints include any one or more of limits to position, rotation, and scale in a 3-dimensional environment relative to a projection; limits to visible area; limits to critical visible geometry regions; limits to material property variances; transformation limits; limits to lighting variances; and limits to environmental effects.

9. The method of claim 1, wherein the user input data is calculated based on horizontal and vertical coordinates received from a mouse pointing device.

10. The method of claim 1, wherein the 2-dimensional image comprises any one or more of an image of an animal, a planet, a game piece, a writing instrument, a musical note, a vehicle, an article of clothing, a bicycle, a wagon, a tricycle, a pair of sunglasses, and a piece of furniture.

11. The method of claim 1, wherein upon authentication, the user is provided access to a computer service.

12. A system for authenticating a user comprising:
    a processor for:
        selecting plurality of 3-dimensional models from a library of 3-dimensional models, each of the 3-dimensional models in the library:
        containing geometric shape data for a respective object in three spatial dimensions; and
        having an associated parameterization comprising a set of one or more rendering parameters specific to said model, each parameter having pre-defined thresholds and/or constraints such that said model remains recognizable by a human,
        wherein the parameterization of one or more of the 3-dimensional models in the library comprises a parameter determining a deformation of the respective geometric shape data for the respective object;
        for each respective selected model, randomly varying the one or more rendering parameters, within the respective pre-defined thresholds and/or constraints for the one or more rendering parameters specific to said model;

generating a 2-dimensional image based on the result of the varying step, such that each respective selected model remains recognizable by a human in said 2-dimensional image;

generating metadata based on each respective selected model, and the one or more rendering parameters, wherein the metadata comprises:
- visibility regions identifying where each respective selected model is not occluded in the 2-dimensional image;
- one or more descriptors identifying categorical properties of one of the respective selected models; and
- one or more descriptors identifying visual properties of one of the respective selected models,
- wherein the categorical and visual properties are recognizable by a human in said 2-dimensional image;

generating a prompt based on at least one of the categorical descriptors and at least one of the visual descriptors;

communicating the 2-dimensional image for presentation at a computer;

communicating the prompt for presentation at the computer;

receiving user input data concerning the 2-dimensional image;

comparing the metadata and the user input data to determine if the user interacting with the computer is a human user, the comparing comprising a comparison of the user input data with the visibility regions; and authenticating or not authenticating based on the result of the comparing step.

13. The system of claim 12, wherein communicating the 2-dimensional image comprises communicating the 2-dimensional image over a computer network to a remote computer.

14. The system of claim 13, wherein the computer network is the Internet.

15. The system of claim 13, wherein the computer network is a wireless network.

16. The system of claim 13, further comprising a memory for storing the metadata at a location apart from the remote computer.

17. The system of claim 12, further comprising the processor storing a shared secret, and wherein selecting one or more 3-dimensional models comprises selecting at least one 3-dimensional model based on the shared secret, and wherein comparing the metadata and the user input data comprises determining whether the shared secret and the user input data are identical.

18. The system of claim 12, wherein the thresholds and/or constraints include any one or more of limits to position, rotation, and scale in a 3-dimensional environment relative to a projection; limits to visible area; limits to critical visible geometry regions; limits to material property variances; transformation limits; limits to lighting variances; and limits to environmental effects.

19. The system of claim 12, wherein the 2-dimensional image comprises one or more of an image of an animal, a planet, a game piece, a writing instrument, a musical note, a vehicle, an article of clothing, a bicycle, a wagon, a tricycle, a pair of sunglasses, and a piece of furniture.

20. A non-transitory computer readable medium having computer executable instructions stored thereon for execution by one or more computers, that when executed implement a method according to claim 1.

21. The method of claim 1, wherein the 2-dimensional image is a static 2-dimensional image.

22. The system of claim 12, wherein the 2-dimensional image is a static 2-dimensional image.

* * * * *

UNITED STATES PATENT AND TRADEMARK OFFICE
CERTIFICATE OF CORRECTION

| | | |
|---|---|---|
| PATENT NO. | : 8,510,814 B2 | Page 1 of 1 |
| APPLICATION NO. | : 12/023328 | |
| DATED | : August 13, 2013 | |
| INVENTOR(S) | : Pratte et al. | |

It is certified that error appears in the above-identified patent and that said Letters Patent is hereby corrected as shown below:

In the Claims

At column 19, line 30, claim 1, delete "selecting plurality of" and replace with -- selecting a plurality of --.

At column 20, line 52, claim 12, delete "selecting plurality of" and replace with -- selecting a plurality of --.

Signed and Sealed this
Twenty-second Day of April, 2014

Michelle K. Lee
*Deputy Director of the United States Patent and Trademark Office*